(12) United States Patent
Eliashevsky et al.

(10) Patent No.: US 12,238,616 B2
(45) Date of Patent: *Feb. 25, 2025

(54) DYNAMIC ASSET TRACKING

(71) Applicant: Insight Direct USA, Inc., Tempe, AZ (US)

(72) Inventors: Ilya Alexander Eliashevsky, Milford, CT (US); Landon Benjamin Register, Lewisville, TX (US); Jonathan Lee Jackson, Charlotte, NC (US); Thomas Richard Pankake, Prospect, CT (US)

(73) Assignee: Insight Direct USA, Inc., Chandler, AZ (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/951,365

(22) Filed: Sep. 23, 2022

(65) Prior Publication Data
US 2024/0107268 A1    Mar. 28, 2024

(51) Int. Cl.
*H04W 4/029* (2018.01)

(52) U.S. Cl.
CPC .................. *H04W 4/029* (2018.02)

(58) Field of Classification Search
CPC .................................................... H04W 4/029
USPC ...................................................... 340/572.1
See application file for complete search history.

(56) References Cited

U.S. PATENT DOCUMENTS

| | | | |
|---|---|---|---|
| 6,614,349 B1 | 9/2003 | Proctor et al. | |
| 7,415,355 B2 | 8/2008 | Janky et al. | |
| 7,571,036 B2 | 8/2009 | Olsen et al. | |
| 7,652,576 B1 | 1/2010 | Crossno et al. | |
| 7,894,987 B1 | 2/2011 | Tester et al. | |
| 8,035,510 B2 | 10/2011 | Pfafman et al. | |
| 8,154,401 B1* | 4/2012 | Bertagna | H04W 4/021 701/31.4 |
| 8,223,009 B2 | 7/2012 | Anderson et al. | |
| 8,374,627 B2 | 2/2013 | Howard et al. | |
| 8,378,813 B2 | 2/2013 | Bannard | |

(Continued)

FOREIGN PATENT DOCUMENTS

| | | |
|---|---|---|
| CA | 2355426 A1 | 2/2003 |
| EP | 2232631 B1 | 3/2015 |

(Continued)

*Primary Examiner* — Zhen Y Wu
(74) *Attorney, Agent, or Firm* — Kinney & Lange, P.A.

(57) ABSTRACT

An asset tracking system includes a tracking device associated with a mobile asset and a centralized device management platform. The tracking device is configured via a set of device configurations. The centralized device management platform includes one or more processors in communication with the tracking device and computer-readable memory encoded with instructions that, when executed, cause the system to receive location data corresponding to a location of the tracking device; evaluate the location data to identify a zone corresponding to a physical region that includes the location of the tracking device; compare an identified zone with a set of location-based rules to identify a rule associated with the identified zone; update the set of device configurations with a device configuration that is associated with an identified rule; and sync an updated set of device configurations to the tracking device to reconfigure the tracking device based on the identified rule.

20 Claims, 14 Drawing Sheets

(56) References Cited

U.S. PATENT DOCUMENTS

| | | | |
|---|---|---|---|
| 8,390,464 B1 | 3/2013 | Slifkin et al. | |
| 8,519,906 B2 | 8/2013 | Richards et al. | |
| 8,576,095 B2 | 11/2013 | Harmon et al. | |
| 8,581,713 B1 | 11/2013 | Morgan et al. | |
| 8,599,003 B2 | 12/2013 | Roberts et al. | |
| 9,064,225 B2 | 6/2015 | Nakra et al. | |
| 9,758,185 B2 | 9/2017 | Hannah et al. | |
| 9,813,850 B2 | 11/2017 | Lee et al. | |
| 9,913,087 B2 | 3/2018 | Jordan et al. | |
| 10,055,763 B2* | 8/2018 | Scott | H04W 4/80 |
| 10,070,255 B1* | 9/2018 | Puppala | G01S 5/02 |
| 10,152,679 B2 | 12/2018 | Burtner et al. | |
| 10,244,352 B2* | 3/2019 | Puppala | G01S 5/02 |
| 10,495,764 B2 | 12/2019 | Bastian et al. | |
| 10,643,441 B1 | 5/2020 | Sanchez | |
| 10,645,534 B1* | 5/2020 | Klinkner | H04W 4/029 |
| 10,764,710 B2* | 9/2020 | Kim | H04W 4/029 |
| 10,957,204 B1 | 3/2021 | Kumar et al. | |
| 11,003,974 B2 | 5/2021 | Carr et al. | |
| 11,051,131 B2 | 6/2021 | Denninghoff | |
| 11,062,255 B2 | 7/2021 | Moakley | |
| 11,069,219 B2 | 7/2021 | London | |
| 11,132,880 B2* | 9/2021 | Hoang | H04W 4/021 |
| 11,184,858 B2 | 11/2021 | Daoura et al. | |
| 11,195,184 B1 | 12/2021 | Dixon et al. | |
| 11,238,398 B2 | 2/2022 | Lau et al. | |
| 11,257,024 B2 | 2/2022 | Barton et al. | |
| 2008/0158002 A1 | 7/2008 | Parkinson et al. | |
| 2009/0063624 A1 | 3/2009 | Nordstrom et al. | |
| 2010/0097208 A1 | 4/2010 | Rosing et al. | |
| 2012/0137436 A1* | 6/2012 | Andrienko | G16H 40/63 5/600 |
| 2014/0274115 A1 | 9/2014 | Michalson et al. | |
| 2015/0002281 A1 | 1/2015 | Berkobin et al. | |
| 2015/0332573 A1* | 11/2015 | Selmanovic | H04L 67/34 455/457 |
| 2016/0165570 A1* | 6/2016 | Kim | H04W 4/029 455/456.2 |
| 2016/0302039 A1* | 10/2016 | Culpepper | H04W 4/025 |
| 2018/0330327 A1 | 11/2018 | Hertenstein et al. | |
| 2019/0058967 A1* | 2/2019 | Puppala | H04W 52/0229 |
| 2020/0322916 A1 | 10/2020 | Ta et al. | |
| 2021/0029780 A1 | 1/2021 | Vernon et al. | |
| 2021/0133662 A1 | 5/2021 | Balakrishnan et al. | |
| 2021/0195386 A1 | 6/2021 | Hajimiri et al. | |
| 2021/0225093 A1 | 7/2021 | Hergesheimer et al. | |
| 2021/0274315 A1 | 9/2021 | Daoura et al. | |
| 2021/0312385 A1 | 10/2021 | Komoni | |
| 2021/0350091 A1 | 11/2021 | Blank et al. | |
| 2022/0377634 A1 | 11/2022 | Balasubramanian et al. | |

FOREIGN PATENT DOCUMENTS

| | | |
|---|---|---|
| EP | 1608993 B1 | 9/2015 |
| EP | 2294563 B1 | 12/2015 |
| EP | 1706849 B1 | 8/2018 |
| EP | 3044989 B1 | 12/2020 |
| EP | 3914922 A1 | 12/2021 |
| EP | 3533244 B1 | 2/2022 |
| WO | 2003060847 A1 | 7/2003 |
| WO | 2006065238 A1 | 6/2006 |
| WO | 2014113882 A1 | 7/2014 |
| WO | 2021150209 A1 | 7/2021 |

* cited by examiner

DYNAMIC ASSET TRACKING

BACKGROUND

The present disclosure relates generally to remote asset monitoring, and more specifically to dynamic asset tracking and device management.

Organizations, such as stores, hospitals, shipping companies, and others often maintain very large numbers of assets associated with their business. These assets of interest can be spread across multiple locations of the organization and may be frequently moved, both in the regular course of business and not. In some cases, assets may be unintentionally removed from an organization's premises, or they may be stolen. Losses due to missing assets can be significant if the assets are unrecoverable.

SUMMARY

In one example, an asset tracking system includes a tracking device associated with a mobile asset and a centralized device management platform. The tracking device is configured via a set of device configurations. The centralized device management platform includes one or more processors in communication with the tracking device and computer-readable memory encoded with instructions that, when executed by the one or more processors, cause the asset tracking system to receive location data corresponding to a location of the tracking device; evaluate the location data to identify a zone corresponding to a physical region that includes the location of the tracking device; compare an identified zone with a set of location-based rules to identify a rule associated with the identified zone; update the set of device configurations with a device configuration that is associated with an identified rule; and sync an updated set of device configurations to the tracking device to reconfigure the tracking device based on the identified rule.

In another example, a method of tracking mobile assets using a centralized device management platform that is remote from the mobile assets includes receiving location data corresponding to a location of a tracking device that is associated with a mobile asset. The tracking device is configured via a set of device configurations. The method further includes evaluating the location data by a computer-based rules engine of the centralized device management platform to identify a zone corresponding to a physical region that includes the location of the tracking device and comparing, by the rules engine, an identified zone with a set of location-based rules to identify a rule associated with the identified zone. The method further includes updating the set of device configurations with a device configuration that is associated with an identified rule and syncing an updated set of device configurations to the tracking device.

DETAILED DESCRIPTION

According to techniques of this disclosure, an asset tracking system includes a mobile platform for centralized management and organization of tracking devices backed by rules and output engines that support location or threshold-based rules for, e.g., actively configuring and/or re-configuring the tracking devices when a boundary is crossed, displaying location or sensor data from the tracking devices, and generating notifications based on the location or sensor data. The centralized platform allows for integrated and dynamic asset tracking without requiring complex or expensive infrastructure. The asset tracking system and corresponding methods disclosed herein will be described below with reference to FIGS. 1A-9.

Figure 1A:
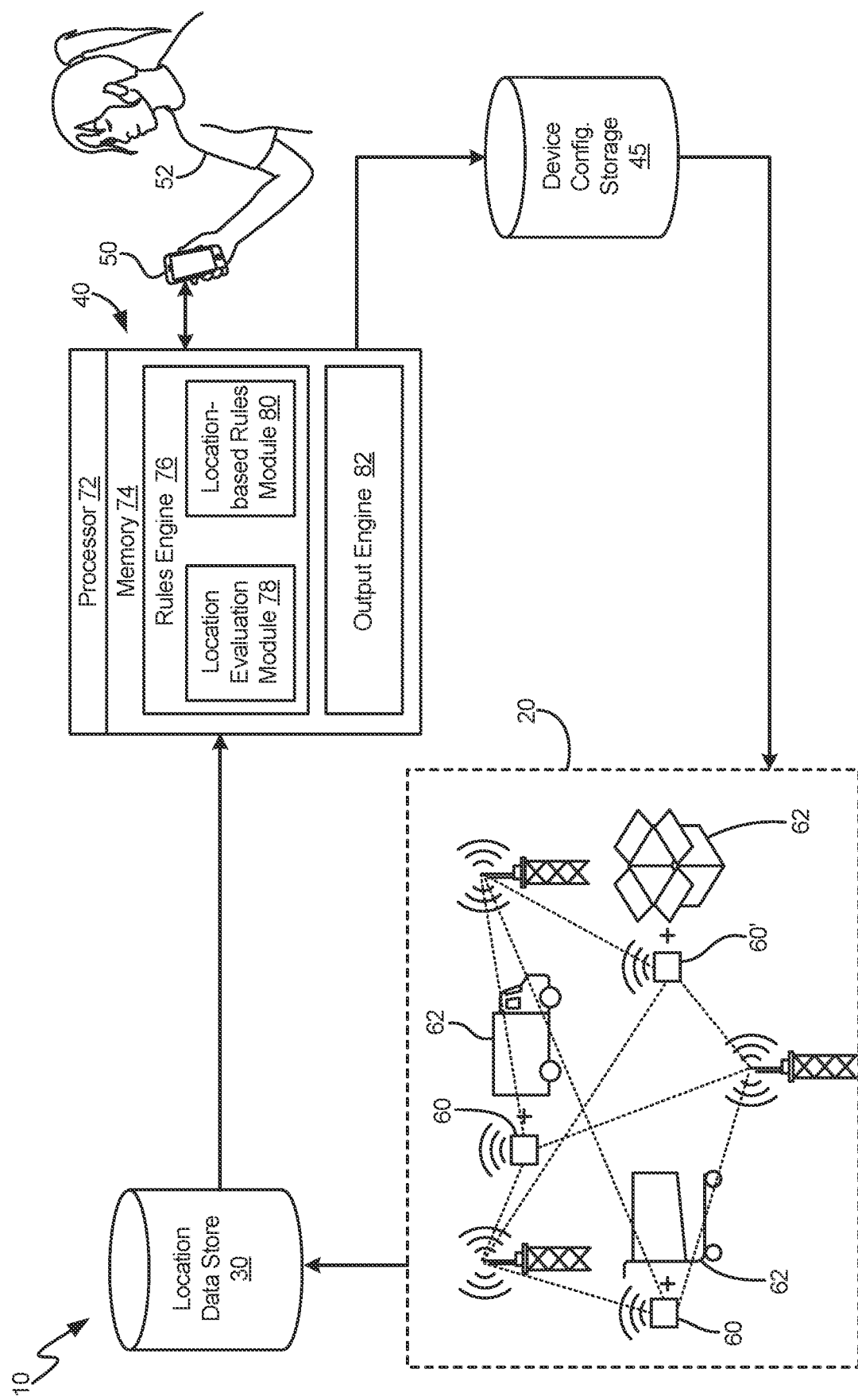
FIG. 1A is a schematic diagram of an asset tracking system architecture.
Figure 1B:
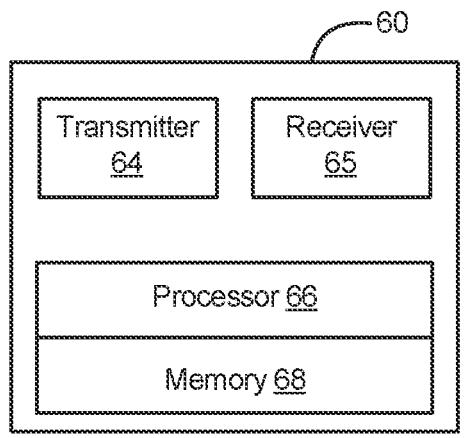
FIGS. 1B-1C are enlarged schematic diagrams of embodiments of a tracking device.
Figure 1C:
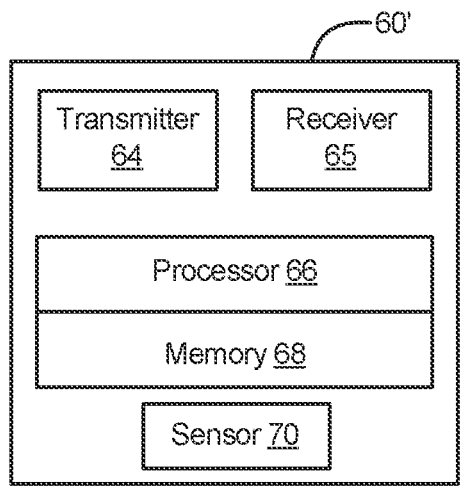
Figure 2:
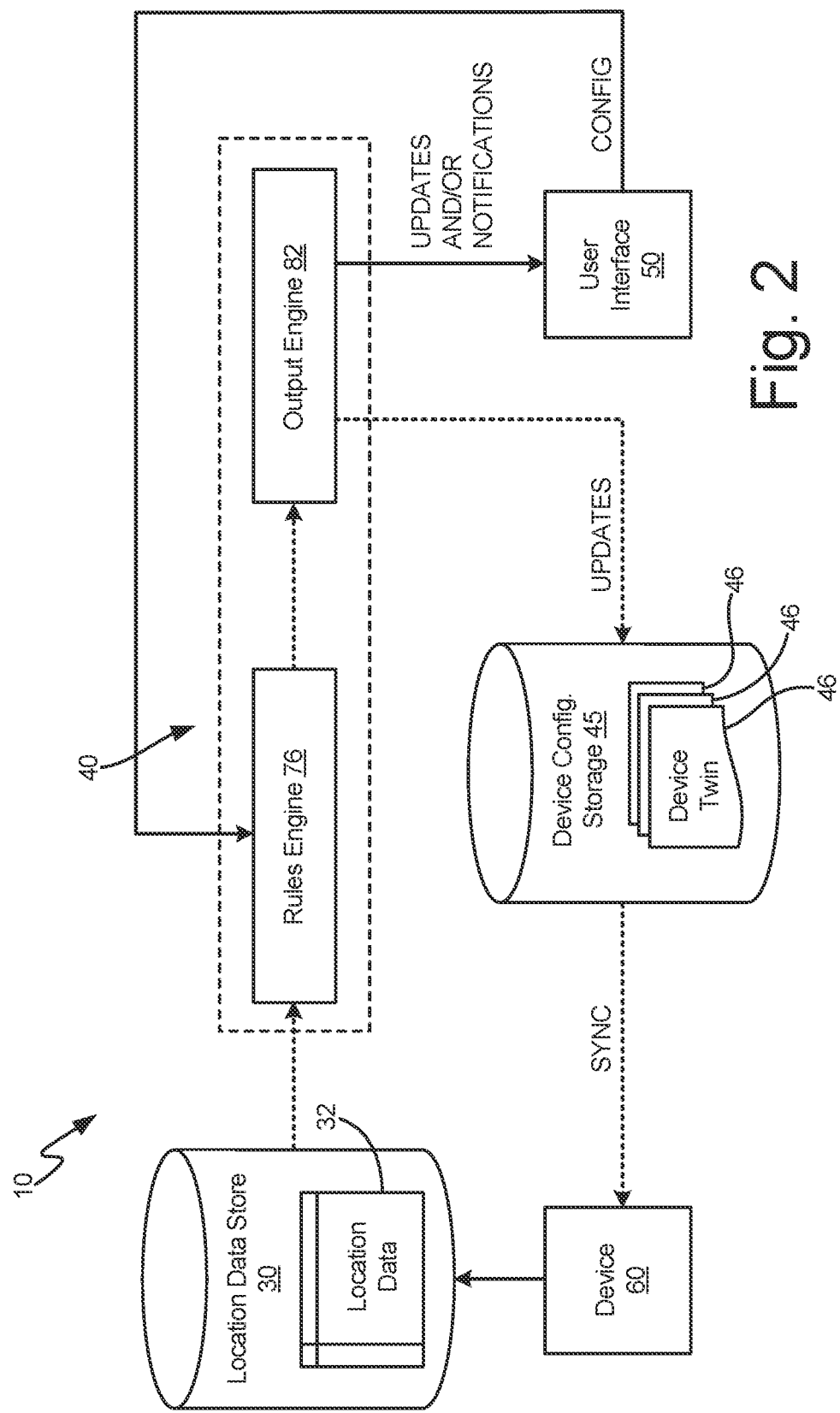
FIG. 2 is a schematic diagram showing details of data flow within an asset tracking system.

FIGS. 1A-2 will be discussed together. FIG. 1A is a schematic diagram of asset tracking system 10. FIG. 1B is an enlarged schematic diagram of tracking device 60. FIG. 1C is an enlarged schematic diagram of tracking device 60'. FIG. 2 is a schematic diagram showing details of data flow within asset tracking system 10. Asset tracking system 10 includes asset tracking network 20, location data store 30, centralized device management platform 40, device configuration storage 45, user interface 50, and users 52. As illustrated in FIG. 2, location data store 30 includes location data 32, and device configuration storage 45 includes device twins 46. Asset tracking network 20 includes any number of tracking devices 60 and/or tracking devices 60' associated with any number of assets 62. As illustrated in FIG. 1B, tracking device 60 includes transmitter 64, receiver 65, onboard processor 66, and onboard memory 68. As illustrated in FIG. 1C, tracking device 60' additionally includes sensor 70. For ease of discussion, shared structure and function of tracking devices 60 and 60' will generally be described with reference to tracking device 60. Centralized device management platform 40 includes processor 72 and memory 74. Centralized device management platform 40 further includes rules engine 76, which includes location evaluator module 78 and location-based rules module 80, and output engine 82.

Asset tracking network 20 is a positioning network for tracking devices 60. Tracking devices 60 can receive positioning (location) information by any suitable positioning means. In some examples, the position of tracking devices 60 can be determined with triangulation, trilateration, or various other algorithms. For example, the position of tracking devices 60 can be determined using cellular towers for cellular devices or satellites for devices that use a global navigation satellite system (GNSS), such as global positioning system (GPS)-enabled devices. In other examples, the position of tracking devices 60 can be determined based on proximity to another device, such as by a Bluetooth or Bluetooth Low Energy (BLE) or other short-range wireless connection to a cellular or GPS-enabled device. In yet other examples, the position of tracking devices 60 can be determined based on a wireless internet connection (Wi-Fi) or a radio signal from a radio frequency identification (RFID) tag. Though asset tracking system 10 is not limited to these embodiments, some networks, such as Wi-Fi, Bluetooth, or RFID, may be more suitable for local or on-premises tracking or for more basic tracking (e.g., localizing an asset either inside or outside a building). On the other hand, cellular or GPS tracking may be more suitable for embodiments where a respective asset 62 is expected to travel a significant distance (e.g., miles). A combination of network types may be suitable to provide sufficient tracking resolution in a range of scenarios. In general, asset tracking system 10 can be implemented with any existing tracking or communications infrastructure to make up asset tracking network 20. That is, an organization implementing asset tracking system 10 may already have Wi-Fi routers or wireless access points on its premises, and cellular towers and satellites are widely available.

Tracking devices 60 are location-aware devices or devices that can send and receive information signals (e.g., location data) and control signals. Tracking devices 60 can, in some examples, be considered Internet of Things (IoT) devices. For example, tracking devices 60 can be any commercially available IoT or "smart" devices capable of transmitting location data and receiving control signals. In some examples, tracking devices 60 are all the same type of tracking device. In other examples, tracking devices 60 include a combination of different types of tracking devices. Although three tracking devices 60 are illustrated in FIG. 1A, it should be understood that other examples can include more or fewer tracking devices 60. Asset tracking system 10 can include a large and scalable number of tracking devices 60.

As illustrated in FIG. 1B, tracking device 60 includes transmitter 64 and receiver 65 (or a transceiver rather than separate transmitter and receiver) for sending and receiving the information signals and control signals. In some examples, tracking devices 60 can include multiple transmitters 64 and receivers 65 (or multiple transceivers) for sending and receiving different types of signals. For example, tracking devices 60 can include separate transmitters 64 and receivers 65 for a cellular signal and a Wi-Fi signal (or any other combination or selection of signal types). Tracking devices 60 can also include other components or features, such as an antenna, an on/off button, a battery or other power supply, or a simple display, for example. In some examples, tracking devices 60 can take the form of relatively small tags that are readily attachable to various types of assets.

Tracking devices 60 also include onboard processor 66 and memory 68. Onboard processor 66 is configured to implement functionality and/or process instructions for tracking device 60. For example, processor 66 can be capable of processing instructions stored in memory 68. Processor 66 can process control instructions or commands from central device management platform 40. Examples of processor 66 can include one or more of a processor, a microprocessor, a controller, a digital signal processor (DSP), an application specific integrated circuit (ASIC), a field-programmable gate array (FPGA), or other equivalent discrete or integrated logic circuitry.

Onboard memory 68 can be configured to store information before, during, and/or after operation of tracking device 60. Memory 68, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 68 can be entirely or partly temporary memory, meaning that a primary purpose of memory 68 is not long-term storage. Memory 68, in some examples, is described as volatile memory, meaning that memory 68 does not maintain stored contents when power to devices (e.g., tracking device 60) is turned off. Examples of volatile memories can include random access memories (RAM), dynamic random access memories (DRAM), static random access memories (SRAM), and other forms of volatile memories. Memory 68, in some examples, also includes one or more computer-readable storage media. Memory 68 can be configured to store larger amounts of information than volatile memory. Memory 68 can further be configured for long-term storage of information. In some examples, memory 68 includes non-volatile storage elements. Examples of such non-volatile storage elements can include magnetic hard discs, optical discs, flash memories, or forms of electrically programmable memories (EPROM) or electrically erasable and programmable (EEPROM) memories.

Onboard memory 68 is encoded with instructions that are executed by processor 66. For example, memory 68 can be used to store program instructions for execution by programs running on processor 66 of tracking device 60. Memory 68 can store configuration information for respective tracking devices 60. In some examples, memory 68 is used by programs running on processor 66 to temporarily store information during program execution.

Tracking device 60', as illustrated in FIG. 1C, is an alternative example of tracking device 60. Tracking device 60' can generally include all the same structure and function as tracking device 60, except tracking device 60' additionally includes sensor 70 for additional telemetry. Sensor 70 can be any type of sensor for measuring (sensing) a parameter associated with a corresponding asset 62. For example, sensor 70 can be a temperature sensor, a pressure sensor, a thermal imaging device, or other sensor type. In some examples, sensor 70 can include more than one sensor. In further examples, sensor 70 can include multiple types of sensors. Moreover, although illustrated in FIG. 1C as a component of tracking device 60', sensor 70 can alternatively be communicatively connected (i.e., send signals/data) to tracking device 60' but not physically implemented as a part of the same device.

Assets 62 can be any mobile assets to be tracked. More specifically, assets 62 can include any assets that users 52 (or groups of users 52 as illustrated in FIG. 2) select to track using tracking devices 60. Each asset 62 is associated with or connected to respective ones of tracking devices 60. In some examples, assets 62 can include shopping carts, wheelchairs, or other assets that individuals will frequently move around a building. In other examples, assets 62 can include fleet vehicles, cargo, or shipped packages that will travel relatively long distances. In some examples, assets 62 can be refrigerated cargo that must be maintained at a certain temperature. Assets 62 and corresponding tracking devices 60 may be distributed throughout a physical area, such as a warehouse, store, campus, hospital, airport, office, construction site, or other facility. In some examples, assets 62 may be distributed within a building and also outside of the building, such as in a parking lot. Assets 62 and corresponding tracking devices 60 may also be in vehicles that travel according to pre-defined routes.

Each of tracking devices 60 can transmit (e.g., by transmitter 64) location data representative of a physical location of that tracking device 60 to location data store 30. When one of tracking devices 60 is associated with a corresponding one of assets 62, the location data is also representative of a physical location of the corresponding one of assets 62. Tracking devices 60' can also transmit sensor data from sensor 70 to location data store 30. Accordingly, each of tracking devices 60 has a respective location data reporting frequency that defines how often tracking devices 60 transmit location data (a rate). The respective location data reporting frequency can include any suitable time increment, such as every minute, every five minutes, every half-hour, hourly, twice daily, daily, etc. Each of tracking devices 60 can be configured with a same or different location data reporting frequency compared to other ones of tracking devices 60. Moreover, in some embodiments, the respective location data reporting frequency for one of tracking devices 60 can be changed (updated). The location data reporting frequency can be set based on internal or external considerations, such as conserving battering life of the respective tracking device 60, accurately recording as much of the movement of the corresponding asset 62 as possible, or other considerations.

Location data store 30 stores collective location data 32 from tracking devices 60. Accordingly, location data store 30 is a collection of electronic data. Location data store 30 can be any suitable electronic data storage means, such as a database, data warehouse, data lake, flat file, or other data storage type. In some examples, location data store 30 can be an "on-premises" data store (e.g., within an organization's data centers). In other examples, location data store 30 can be a "cloud" data store that is available using cloud services from vendors such as Amazon, Microsoft, or Google. In some examples, location data store 30 can be a cloud service that is provided and maintained by a third-party vendor, such as a third-party vendor associated with tracking devices 60. For example, location data store 30 as a third-party service can provide a level of abstraction between location data 32 and a request for the data, rather than permitting direct access to location data store 30. Electronic data stored in location data store 30 is accessible by centralized device management platform 40. In some examples, centralized device management platform 40 can access data from location data store 30 via an application programming interface (API), such as via an API provided by the third-party vendor in examples where location data store 30 is a third-party service, or some other communication interface.

Location data 32 (as shown in FIG. 2) is a collection of location data transmitted by tracking devices 60. In some embodiments, location data 32 can also include, or be associated with, sensor data from tracking devices 60'. Location data 32 can be organized in any suitable data structure that preserves the relationship between the location data and the source (e.g., ones of tracking devices 60). For example, location data 32 can be organized in rows or columns in a table, wherein each row (or column) corresponds to a location data transmission from one of tracking devices 60. Individual records (e.g., a row) within location data 32 can include, or be associated with, identifying information for a respective tracking device 60 from which the recorded location data was received. For example, each tracking device 60 may be assigned a unique identifier or code that is then associated with each location data transmission from that tracking device 60. Individual records within location data 32 can include, e.g., coordinate information (latitude and longitude), distance information with respect to a defined point, or more general location information, such as an indication of in-range or out-of-range. In general, location data 32 is updated based on the location data reporting frequency of each tracking device 60. For example, when one of tracking devices 60 is configured with an hourly location data reporting frequency, location data 32 will be updated hourly with a new individual record corresponding to the location data transmission from the respective tracking device 60. In some examples, tracking device 60 may transmit additional location data in a single update period for more granular tracking history. Each individual record within location data 32 can be associated with a time the location data was received from the respective tracking device 60 (i.e., time-stamped data). Each individual record within location data 32 can also be associated with a strength of the transmitted signal from the respective tracking device 60. Location data 32 can also include historical data. That is, records within location data 32 may not be overwritten every time new location data is received.

Centralized device management platform 40 is a central platform for remotely managing tracking devices 60. Centralized device management platform 40 includes processor 72 and memory 74. Although processor 72 and memory 74 are illustrated in FIG. 1A as being separate components of a single computer device, it should be understood that in other examples, processor 72 and memory 74 can be distributed among multiple connected devices. In other examples, memory 74 can be a component of processor 72. In some examples, centralized device management platform 40 is a wholly or partially cloud-based platform. In some examples, centralized device management platform 40 can include processing on edge devices. Centralized device management platform 40 can also include a web server, e.g., for running an API to connect to mobile applications. Moreover, although not shown in FIGS. 1A and 2, centralized device management platform 40 can include any suitable communication interface modules (software and/or hardware) for establishing communication with other components of asset tracking system 10, such as location data store 30, device configuration storage 45, user interface 50, and tracking devices 60. For example, the communication interface modules can account for authorization or security requirements for accessing data located in location data store 30 or device configuration storage 45 or for communicating with user interface 50 and tracking devices 60. In some examples, a communication interface module can allow centralized device management platform 40 to communicate with tracking devices 60 indirectly through a third-party system (e.g., via an API provided by the third-party vendor). In other examples, location data store 30 and device configuration storage 45 can be a part of centralized device management platform 40.

Processor 72 is configured to implement functionality and/or process instructions within centralized device management platform 40. For example, processor 72 can be capable of processing instructions stored in memory 74. Examples of processor 72 can include one or more of a processor, a microprocessor, a controller, a digital signal processor (DSP), an application specific integrated circuit (ASIC), a field-programmable gate array (FPGA), or other equivalent discrete or integrated logic circuitry.

Memory 74 can be configured to store information before, during, and/or after operation of centralized device management platform 40. Memory 74, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 74 can be entirely or partly temporary memory, meaning that a primary purpose of memory 74 is not long-term storage. Memory 74, in some examples, is described as volatile memory, meaning that memory 74 does not maintain stored contents when power to devices (e.g., hardware of centralized device management platform 40) is turned off. Examples of volatile memories can include random access memories (RAM), dynamic random access memories (DRAM), static random access memories (SRAM), and other forms of volatile memories. Memory 74, in some examples, also includes one or more computer-readable storage media. Memory 74 can be configured to store larger amounts of information than volatile memory. Memory 74 can further be configured for long-term storage of information. In some examples, memory 74 includes non-volatile storage elements. Examples of such non-volatile storage elements can include magnetic hard discs, optical discs, flash memories, or forms of electrically programmable memories (EPROM) or electrically erasable and programmable (EEPROM) memories.

Memory 74 is encoded with instructions that are executed by processor 72. For example, memory 74 can be used to store program instructions for execution by rules engine 76 or output engine 82 on processor 72. In some examples, memory 74 is used by software or applications running on processor 72, e.g., rules engine 76 or output engine 82, to temporarily store information during program execution.

Rules engine 76 is a first functional module of centralized device management platform 40. Rules engine 76 is a collection of computer code in any suitable programming language. Rules engine 76 can be a computer program or a script that can also be, to some degree, configurable. In general, rules engine 76 accesses or receives and evaluates location data 32 to associate locations of tracking devices 60 with predefined location or threshold-based rules. Rules engine 76 is capable of running per-device rules. Activities of rules engine 76 can be further divided functionally into sub-modules, including location evaluator module 78 and location-based rules module 80.

Location evaluator module 78 is a first functional sub-module of rules engine 76. Location evaluator module 78 can be part of the rules engine computer program itself (i.e., written in code) and/or can be a functional representation of the rules engine computer program executing code based on a configuration. In general, location evaluator module 78 accesses or receives location data 32 and compares the location data indicating the position of ones of tracking devices 60 (e.g., individual records in location data 32) to predefined geofence zones to identify a geofence zone (an identified zone) that includes the location of the respective tracking device 60. In some examples, location evaluator module 78 can be configured or written to run whenever new location data is loaded from location data store 30 (e.g., based on the location data reporting frequency of tracking devices 60).

Location evaluator module 78 can include methods in code for receiving and interpreting location data 32 and for establishing geofence zones (geofencing techniques). Geofence zones are representations of real-world geographic areas or physical regions that are bounded by a virtual perimeter. Geofencing techniques can include dynamically generating a geofence as a set radius around any point location or statically defining a set of boundaries. Methods for identifying a geofence zone that includes the location of the respective tracking device 60 can include, in some examples, evaluating geographic coordinates or, in other examples, can be a simpler in-range or out-of-range determination, depending on the signal type for the respective tracking device 60. In some examples, evaluating geographic coordinates can further include performing an inside/outside check algorithm on polygons (triangles) of the geofence zone.

The actual geofence zones for a particular application of asset tracking system 10 can be configurations. Configurations for geofence zones can be input by developers or users 52, e.g. via user interface 50. In some examples, configurations for geofence zones can also be stored, e.g., in a database (not shown), and accessed by location evaluator module 78. In other examples, configurations for geofence zones can be packaged with the code and updated periodically. Additionally, as will be described in greater detail below, configured geofence zones can be linked to device twins 46 and provisioned during device provisioning of tracking devices 60.

The predefined geofence zones utilized in location evaluator module 78 can take a variety of forms. In some examples, the geofence zones can include zones that correspond to real-world boundaries or areas of interest to an organization, such as surrounding a parking lot, a construction site, a floor of a hospital, a region of a campus, etc. In some examples, one geofence zone can be predefined as a "home" zone or a zone associated with an area within which tracking devices 60 are expected to remain. In some examples, the geofence zones can include consecutive or adjacent regions. In other examples, one geofence zone may be entirely contained within another geofence zone. In some examples, the geofence zones can be polygonal, including regular or irregular polygonal zones formed by a two-dimensional polygonal (triangle, square, hexagon, etc.) mesh. In other examples, the geofence zones can be circular zones that extend a fixed radial distance around a central point. As will be described in greater detail below, geofence zones can be manually drawn with a display via user interface 50.

Location evaluator module 78 can further include functionality for determining (e.g., counting) if or how many consecutive locations reported from a respective tracking device 60 are within the identified geofence zone that corresponds to the most recent location reported from the respective tracking device 60. That is, location evaluator module 78 can determine if tracking device 60 has entered the identified zone in the time since the immediately previous location data report from that tracking device (i.e., the immediately previous location reported from that tracking device 60 was not within the identified zone/was in a different zone) or if one or more previous locations reported from that tracking device are also within the identified zone. In some examples, location evaluator module 78 can determine if a number of consecutive locations of tracking device 60 that are within the identified zone exceeds a threshold number, such as more than one consecutive location within the identified zone (i.e., at least two in a row). This determination can be based on the location data reporting frequency of the respective tracking device 60 such that the threshold number can be defined as a threshold duration (time tracking device 60 has spent in the identified zone). The threshold duration can be any desired amount of time, such as an hour, two hours, a day, etc. Additionally, or alternatively, location evaluator module 78 can include functionality for determining a distance that a respective tracking device 60 has traveled into the identified zone from a previous zone in which the respective tracking device 60 was located. In some examples, this distance may represent a distance outside of a home or expected zone for the respective tracking device 60. In these ways, any brief excursions that tracking devices 60 make across geofence boundaries before quickly returning within the boundary may not exceed a threshold for proceeding with the process for updating tracking devices 60. Duration or distance-based thresholds for quantifying the presence of tracking devices 60 in the identified zone and filtering the output can be used separately, in combination, or not at all, depending on the use case. Location evaluator module 78 may not evaluate for a threshold in use cases where a single location report from one of tracking devices 60 in the identified zone is sufficient to warrant a notification or change in device functionality. Such examples can include, tracking hazardous materials, baby location monitoring, etc. In these cases, asset tracking system 10 can be configured via location evaluator module 78 to prioritize alerts and updates over verifying the presence of tracking devices 60 in the identified zone.

Location-based rules module 80 is a second functional sub-module of rules engine 76. Location-based rules module 80 can be part of the rules engine computer program itself (i.e., written in code) and/or can be a functional representation of the rules engine computer program executing code based on a configuration. In general, location-based rules module 80 compares the identified zone from location evaluator module 78 to a set of "rules" to identify a rule (an identified rule) that is associated with the identified zone. The set of predefined rules connect (or associate) one or more device configuration instructions to ones of the predefined geofence zones from location evaluator module 78. As will be described in greater detail below with respect to output engine 82 and FIG. 4, each predefined rule can also be associated with a target "audience" or group of users 52 for notifications.

Location-based rules module 80 can include methods in code for changing device configurations (i.e., device configuration instructions) for tracking devices 60. The device configuration instructions can include methods for setting or changing device configurations for tracking devices 60, such as, e.g., an asset type identification corresponding to a respective asset 62 that is associated with each tracking device 60, a location data reporting frequency, a signal type for transmitting location data, and an enabled or disabled state of a sensor component (e.g., sensor 70 of tracking device 60' in FIG. 1C), or other methods. The device configuration instructions can be modified by adding, removing, or changing the underlying code for location-based rules module 80.

The device configuration instructions are also associated with location or threshold-based conditions to form the set of predefined rules. The conditions can be based on one or more geofence zones that are predefined from location evaluator module 78. In other words, the device configuration instructions can be conditional actions for configuring or reconfiguring tracking devices 60 according to a state of the respective tracking device 60, such as which geofence zone the respective tracking device 60 is located within. In some examples, the location-based condition can be that the respective tracking device 60 has crossed a boundary into one of the predefined geofence zones and has most recently reported its location within that geofence zone, e.g., as determined by location evaluator module 78. In other examples, the location-based condition can be that the respective tracking device 60 has remained in one of the predefined geofence zones for at least a threshold amount of time, e.g., as determined by location evaluator module 78. In alternative embodiments, the device configuration instructions can also be conditioned on thresholds for other types of data, such as temperature data or pressure data from sensors 70 (FIG. 1C), for example.

The location or threshold-based conditions and the application of those conditions to device configuration instructions for a particular application of asset tracking system 10 can be configurations. Configurations for the location or threshold-based conditions and their application to particular device configuration instructions can be input by developers or users 52, e.g., via user interface 50. In some examples, these configurations can also be stored, e.g., in a database (not shown), and accessed by location-based rules module 80. In other examples, the configurations can be packaged with the code and updated periodically.

Output engine 82 is a second functional module of centralized device management platform 40. Output engine 82 is a collection of computer code in any suitable programming language. Output engine 82 can be a computer program or a script. In general, output engine 82 performs workflow management-type functions and causes updates and/or notifications to be communicated to user interface 50 and to device twins 46 in device configuration storage 45 (each of which will be described in greater detail below). The updates and/or notifications communicated by output engine 82 are based on the identified rule from location-based rules module 80 that is associated with the identified zone from location evaluator module 78 of rules engine 76. In other words, output engine 82 takes the state of the system as determined by rules engine 76 and applies corresponding outputs.

Output engine 82 can include methods in code for communicating updates to device twins 46 and syncing changes to tracking devices 60. More specifically, output engine 82 can include methods for updating the set of device configurations of the respective device twin 46 with the device configuration that is associated with the identified rule from location-based rules module 80. That is, output engine 82 can update the respective device twin 46 when one of tracking devices 60 has moved to a different geofence zone, such as for a threshold amount of time. On the other hand, output engine 82 may not communicate any updates to device twins 46 when tracking devices 60 have not moved to a different geofence zone.

In some examples, output engine 82 can also include methods in code for comparing the device configuration instruction that is associated with the identified rule to a pre-existing device configuration that is defined in a respective device twin 46 for the one of tracking devices 60 from which location data was reported and evaluated in location evaluator module 78 to determine if the device configuration instruction that is associated with the identified rule is different from the pre-existing device configuration or if they match (e.g., are the same). In some examples, output engine 82 can communicate an update to the respective device twin 46 if the device configuration instruction that is associated with the identified rule and the pre-existing device configuration are different. In other examples, output engine 82 can always communicate an update to the respective device twin 46, regardless of whether there has been a previous determination that the device configuration instruction that is associated with the identified rule is different from the pre-existing device configuration (though it would be expected that the configurations would be different if the corresponding tracking device 60 has moved into a different geofence zone).

Once the respective device twin 46 has been updated, output engine 82 can cause the updated set of device configurations to be synced (or synchronized) to the corresponding one of tracking devices 60 to reconfigure it based on the identified rule. That is, each tracking device 60 can receive an updated set of device configurations that matches (or is the same) as the updated set of device configurations that is represented in the respective device twin 46. A sync service can evaluate changes to the set of device configurations in respective device twins 46 and make corresponding tracking devices 60 compliant with the respective device twins 46. That is, the updated set of device configurations can be synced to tracking device 60 via a sync service or interface that, in some examples, is hosted by centralized device management platform 40 via output engine 82, or that, in other examples, is part of a third-party system that is directed to sync with tracking devices 60 via a communication from centralized device management platform 40. In some examples, centralized device management platform 40 communicates with a third-party system via an API, such as via an API provided by the third-party vendor.

Output engine 82 can also include methods in code for communicating updates and/or notifications to user interface 50. For example, output engine 82 can include workflow methods for determining when the identified rule from location-based rules module 78 is associated with a notification for one or more groups of users 52. Notifications can include, e.g., an indication that one of tracking devices 60 is in a different geofence zone, an indication that one of tracking devices 60 has been in a different geofence zone for a threshold amount of time, or other notifications. In some examples, notifications can include an indication of elevation in severity state as one of tracking devices 60 moves from one geofence zone to another. In some examples, the notifications are generated by output engine 82 and delivered to user interface 50 in the form of alerts. In other examples, the notifications can be associated with an email that users 52 can receive in an email client or with a message received via a messaging service such as SMS, etc. Output engine 82 can also include methods for communicating other updates to user interface 50, such as updates to a graphical representation of locations of tracking devices 60 (e.g., adding a graphical indicator to ones of tracking devices 60 that are outside of a home zone).

Device configuration storage 45 stores configuration information for tracking devices 60. Accordingly, device configuration storage 45 is a collection of electronic data. Device configuration storage 45 can be any suitable electronic data storage means, such as a database, data warehouse, data lake, flat file, or other data storage type. In some examples, device configuration storage 45 can be an "on-premises" data store (e.g., within an organization's data centers). In other examples, device configuration storage 45 can be a "cloud" data store that is available using cloud services from vendors such as Amazon, Microsoft, or Google. In some examples, device configuration storage 45 can be a cloud service that is provided and maintained by a third-party vendor, such as a third-party vendor associated with tracking devices 60. For example, device configuration storage 45 as a third-party service can provide a level of abstraction between the configuration information for tracking devices 60 and a request for the data, rather than permitting direct access to device configuration storage 45. In some examples, device configuration storage 45 and location data store 30 can be services provided by the same third-party vendor. Electronic data stored in device configuration storage 45 can be modified, either directly or indirectly, by centralized device management platform 40. In some examples, centralized device management platform 40 can access data from device configuration storage 45 via an API, such as via an API provided by the third-party vendor in examples where device configuration storage 45 is a third-party service, or some other communication interface.

As illustrated in FIG. 2, device configuration information stored in device configuration storage 45 can take the form of device twins 46. Each device twin 46 corresponds to one of tracking devices 60. Each device twin 46 is a "digital twin" or virtual representation that serves as the digital counterpart of the corresponding physical tracking device 60. In general, each device twin 46 can include a digital representation of an asset type associated with the corresponding tracking device 60, a class associated with the corresponding tracking device 60 and/or its components (e.g., sensor 70 of tracking device 60' in FIG. 1C), base and current configurations of the corresponding tracking device 60 and/or its components, and a current state of the corresponding tracking device 60 and/or its components. Each device twin 46 can have a unique identifier that is associated with a unique identifier for the corresponding one of tracking devices 60.

More specifically, each device twin 46 includes a set of device configurations to be deployed for a corresponding one of tracking devices 60. As such, device twins 46 can be asset templates for configuring tracking devices 60. That is, each tracking device 60 can be configured or provisioned from an initial state using a corresponding device twin 46 that defines all the configuration information for that tracking device 60. Alternatively, an initial version of each device twin 46 can be filled out based on information from the respective tracking device 60. Tracking devices 60 that have been configured from an initial state can be described as having pre-existing device configurations (that are defined in the set of device configurations of the corresponding device twin 46) with respect to any subsequent updates based on identified rules from location-based rules module 80. Device twins 46 include parameter definitions and values that are required for implementation and functionality of tracking devices 60. For example, device configurations (i.e., a set of device configurations) defined in device twins 46 can include an asset type identification corresponding to a respective asset 62 that is associated with the one of tracking devices 60, a location data reporting frequency, a signal type for transmitting location data, and an enabled or disabled state of a sensor component (e.g., sensor 70 of tracking device 60' in FIG. 1C), or any other configurations for functionality of tracking devices 60. The device configurations defined in device twins 46 can also include a home zone identification corresponding to a predefined geofence zone that is a home zone for a respective tracking device 60. Device twins 46 can be updated by output engine 82 with new or changed device configurations based on identified rules from location-based rules module 80.

User interface 50 can be communicatively coupled to centralized device management platform 40 to enable users 52 to interact with centralized device management platform 40, such as for, e.g., accessing and viewing information associated with tracking devices 60, receiving notifications generated by output engine 82, configuring centralized device management platform 40, etc. User interface 50 can include a display device and/or other user interface elements (e.g., keyboard, buttons, monitor, graphical control elements presented at a touch-sensitive display, or other user interface elements). In some examples, user interface 50 includes a graphical user interface (GUI) that includes graphical representations of information associated with tracking devices 60 and/or notifications generated by output engine 82. For example, user interface 50 can include graphical representations of locations of tracking devices 60 presented on a map, times that location data was last received from each of tracking devices 60, strength of the transmitted signal from each of tracking devices 60, device configuration information, etc. Trend information about tracking devices 60 can also be derived from the collective location data and presented with visualizations for users 52 via user interface 50. For example, user interface 50 can include a graphical representation of a percentage of assets 62 that are in an expected zone (e.g., on the organization's property) compared to a percentage of assets 62 that are outside of the expected zone. As will be described in greater detail below with respect to FIG. 4, user interface 50 can have multiple display or accessibility configurations based on groups of users.

In some examples, user interface 50 can take the form of a mobile device (e.g., a smart phone, a tablet, etc.) with an application downloaded that is designed to connect to centralized device management platform 40. In such examples, user 52 can load the application on the mobile device, and the device can communicate a request to centralized device management platform 40 (e.g., via an API running on a web server) to receive updated application data. Once updated data has been received at user interface 50, users 52 can view any notifications and view updated locations of tracking devices 60.

Users 52 can also configure aspects of centralized device management platform 40 via user interface 50. For example, users 52 can select configurations for configuration-driven modules of rules engine 76. In some examples, users 52 can set boundaries (geofences) to define zones for location evaluator module 78 of rules engine 76. In some examples, setting boundaries to define the zones can include manually drawing boundaries using a GUI that displays a map. In some examples, users 52 can select conditional actions (e.g., device configuration changes) to associate with a location or zone for location-based rules module 80 of rules engine 76. Any configurations set or selected by users 52 can then be communicated to centralized device management platform 40 (e.g., via an API running on a web server) so that rules engine 76, including location evaluator module 78 and location-based rules module 80, can execute code based on the configurations.

In general, each of location data store 30, components of centralized device management platform 40, device configuration storage 45, and user(s) 52 (along with user interface 50) can be remote from each other. In some examples, location data store 30 and/or device configuration storage is a cloud-based data store. Location data store 30 and device configuration storage can be available from a same or different cloud service in examples where both location data store 30 and device configuration storage 45 are cloud-based. Centralized device management platform 40 can also be wholly or partially cloud-based. Moreover, one or more processes of centralized device management platform 40 may not be executed in a fixed location, i.e., one or more processes of centralized device management platform 40 can be executed in different locations (e.g., on different processors).

In operation, assets 62 move or are moved, and corresponding tracking devices 60 periodically transmit location data to location data store 30. Centralized device management platform 40 retrieves location data 32 from location data store 30. Location data 32 is evaluated by location evaluator module 78 of rules engine 76 to identify geofence zones that include the location of each tracking device 60. Location-based rules module 80 compares the identified zones to stored rules to identify rules that are associated with the identified zones. Centralized device management platform 40 communicates (or interfaces) with user interface 50 and/or device configuration storage 45 (and, subsequently, tracking devices 60) based on instructions from output engine 82 that are, in turn, based on the identified rules from rules engine 76. Notifications may be generated by output engine 82 and available to users 52 via user interface 50 or other means, such as email, SMS, etc. User interface 50 can also display updated information about tracking devices 60 and corresponding tracked assets 62. One or more of device twins 46 in device configuration storage 45 are updated based on the instructions from output engine 82, and updated ones of device twins 46 are synced to corresponding tracking devices 60. Tracking devices 60 are thereby reconfigured to have changed functionality according to the device configurations in the corresponding ones of device twins 46.

Asset tracking system 10, according to techniques of this disclosure, allows for dynamic asset tracking without requiring the addition of extensive (and potentially expensive) infrastructure because asset tracking system 10 can be implemented using available tracking technologies. Asset tracking system 10 also simplifies system management because tracking device reconfiguration and generation of notifications happen centrally by centralized device management platform 40. Moreover, the functional modules of centralized device management platform 40 (rules engine 76 and output engine 82) work in tandem to allow tracking device reconfiguration and generation of notifications to occur dynamically (or essentially automatically) as tracking devices 60 move. Accordingly, asset tracking system 10 can require relatively less active upkeep to track assets 62, i.e., can be more efficient and save time, compared to other asset tracking systems, as manual interaction with asset tracking system 10 by technicians is minimized. In some specific situations, remote reconfiguration of deployed tracking devices 60 allows tracking devices 60 to be reconfigured to have functionality that better matches the conditions each tracking device 60 is experiencing, such as to make more accurate measurements from a sensor (e.g., sensor 70 in FIG. 1C) or to conserve battery life, for example. These reconfigurations may not otherwise be possible manually if tracking devices 60 have been moved off an organization's premises and/or are not readily recoverable or accessible.

Similarly, tracking devices 60 in asset tracking system 10 are readily reusable for different applications because device configuration is linked to device location and tracking devices 60 can be automatically reconfigured for a new purpose based entirely on their location. This reduces the number of manual steps that would otherwise be required for updating an organization's network of devices.

Asset tracking system 10 is also highly flexible and modifiable such that it can be implemented in a wide range of asset tracking scenarios. For example, rules engine 76 of centralized device management platform 40 can be readily updated to add more location-based rules and grow the system. Rules engine 76 can also be reconfigured to include, e.g., new geofence zones, different conditions for device configurations, etc., so that the location-based rules can apply to different scenarios. Asset tracking system 10 can also integrate sensor data from additional sensors with location data from tracking devices (e.g., tracking devices 60' in FIG. 1C) for more complex asset tracking and device reconfiguration capabilities.

Further, information (e.g., location data 32) about tracked assets (tracking devices 60 and associated assets 62) is evaluated centrally and available to users 52 via user interface 50 in communication with centralized device management platform 40. Location data 32, including historical data, can be used at scale to track trends across all deployed tracking devices 60 for an organization. For example, an organization can track counts of tracked assets 62 that are in a corresponding home zone compared to those that are outside the home zone for one or more branches of the organization. With this trend information, an organization can derive business insights and take targeted corrective actions, e.g., to improve operational processes relating to asset management.

Figure 3:
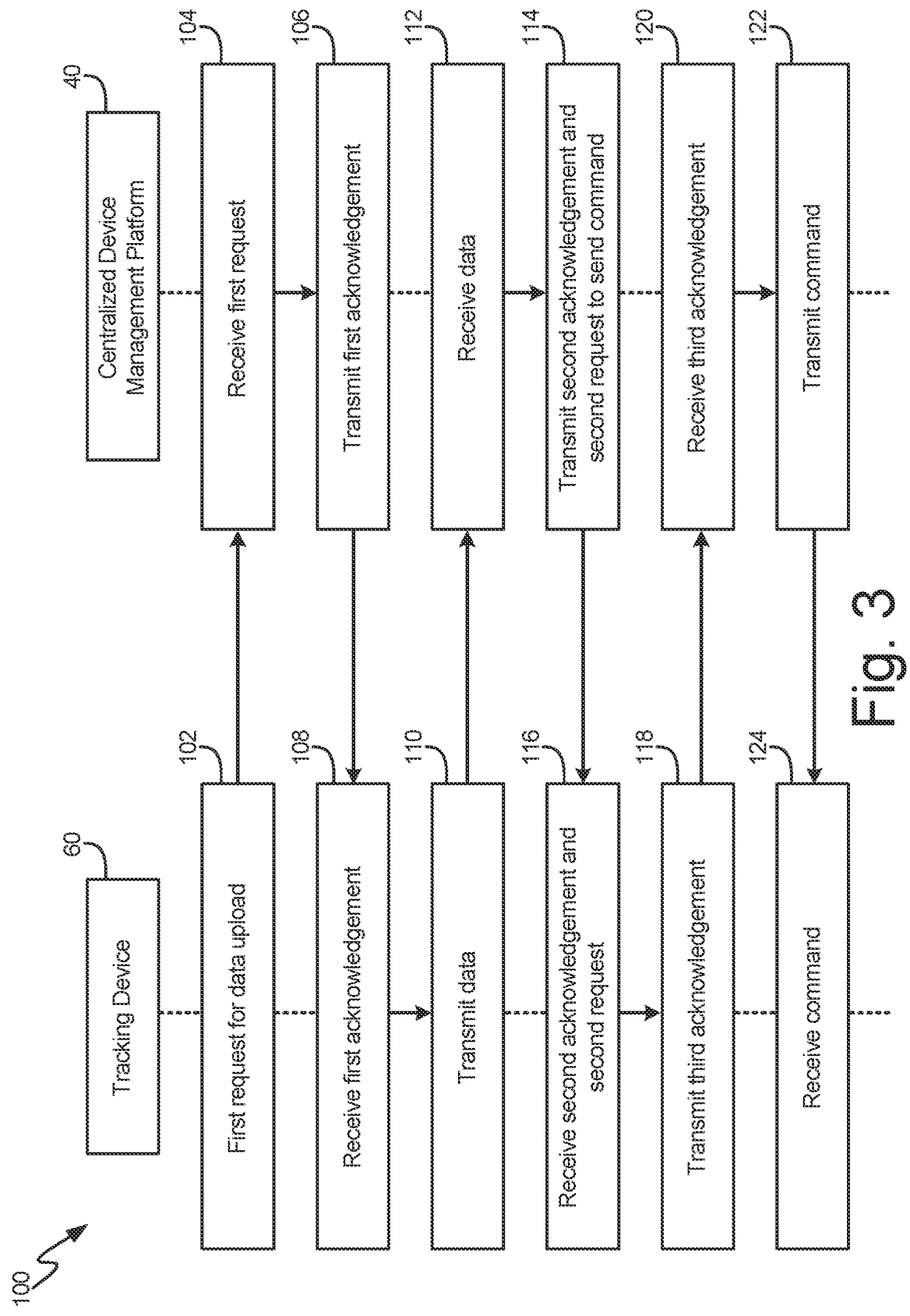
FIG. 3 is a schematic diagram of a communication protocol for a tracking device and a centralized device management platform.

FIG. 3 is a schematic diagram of communication protocol 100 for tracking device 60 and centralized device management platform 40. As illustrated in FIG. 3, communication protocol 100 includes steps 102-124. Communication protocol 100 represents one non-limiting example of a protocol or sequence of actions for centralized device management platform 40 and tracking device 60 to establish a connection and send or receive data and/or commands. For example, communication protocol 100 can utilize communication interface features of centralized device management platform 40. It should be understood, however, that other communications protocols can also be used with centralized device management platform 40 and tracking device 60.

Step 102 is a first step of communication protocol 100. At step 102, tracking device 60 sends a first request for a data upload to centralized device management platform 40. At step 104, centralized device management platform 40 receives the first request from tracking device 60 and, at step 106, centralized device management platform 40 transmits a first acknowledgement to tracking device 60. At step 108, tracking device 60 receives the first acknowledgement from centralized device management platform 40. At step 110, tracking device 60 transmits data to centralized device management platform 40, and centralized device management platform 40 receives the data at step 112. For example, the data transmitted by tracking device 60 in step 110 and received by centralized device management platform 40 in step 112 can include location and/or sensor data (e.g., as described above with reference to FIGS. 1A and 2).

At step 114, centralized device management platform 40 transmits a second acknowledgement (of receipt of the data) and also transmits a second request to send a command to tracking device 60. At step 116, tracking device receives the second acknowledgement and the second request, and, at step 118, tracking device 60 transmits a third acknowledgement to centralized device management platform 40. At step 120, centralized device management platform 40 receives the third acknowledgement. At step 122, centralized device management platform 40 transmits a command to tracking device 60. Step 124 is a final or sequentially last step of communication protocol 100. At step 124, tracking device 60 receives the command from centralized device management platform 40. For example, the command transmitted to and received by tracking device 60 in steps 122 and 124, respectively, can include instructions for reconfiguring tracking device 60 based on a device configuration in an updated device twin 46 (e.g., as described above with reference to FIG. 2). In other examples, the command can be that there are no commands (e.g., if the respective device twin 46 was not updated).

Communication protocol 100 can be implemented for an embodiment of asset tracking system 10 where centralized device management platform 40 communicates directly with tracking devices 60, rather than indirectly through a third-party system. However, it should be understood that a similar communication sequence could occur in an alternative embodiment where a third-party system communicates directly with the tracking devices (and centralized device management platform 40 communicates with the third-party system). In an indirect communication embodiment, the third-party system would effectively serve as an intermediate between centralized device management platform 40 and tracking devices 60, and steps in communication protocol 100 that are assigned to centralized device management platform 40 could instead be carried out by the third-party system.

Asset tracking system 10 of FIGS. 1A and 2 using communication protocol 100 allows communications from centralized device management platform 40 to remotely reconfigure tracking devices 60. In this way, one or more tracking devices 60 can be dynamically reconfigured based on location-based rules from rules engine 76. That is, tracking devices 60 can be reconfigured in response to a change that occurs after tracking devices 60 have been deployed and associated with assets 62 without requiring a technician to manually update the devices in the field. This is useful so that tracking devices can seamlessly transition between different configurations as the devices move between zones. Further, certain device configurations may be desired when an asset has been removed from an organization's premises (e.g., a lost or stolen asset), and it may not otherwise be feasible for the corresponding tracking device to be reconfigured until the asset was recovered.

Figure 4:
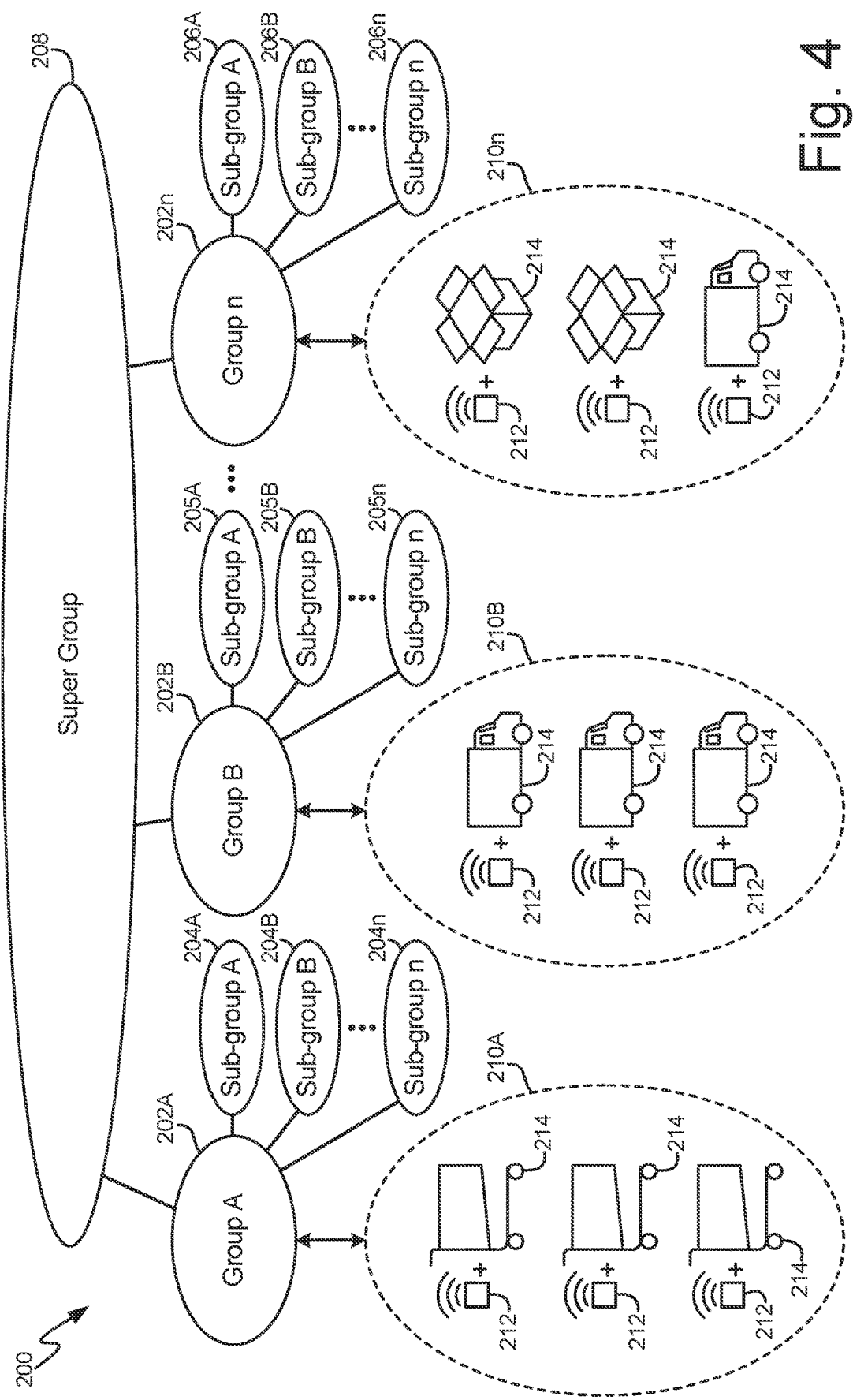
FIG. 4 is a schematic diagram illustrating an example organization of groups and corresponding tracked assets.

FIG. 4 is a schematic diagram illustrating an example organization of groups 202A-202n and corresponding sets of tracked assets 210A-210n. As illustrated in FIG. 4, organizational hierarchy 200 includes groups 202A-202n (the character "n" is used herein as an arbitrary reference character to indicate any integer value), which include corresponding subset groups 204A-204n, 205A-205n, and 206A-206n. Groups 202A-202n are also organized under super group 208. Each of groups 202A-202n is associated with a corresponding set of tracked assets 210A-210n, each of which includes corresponding tracking devices 212 and assets 214.

Organizational hierarchy 200 represents an example organization of relationships between groups of users (e.g., users 52 shown in FIG. 1A) of asset tracking system 10. The illustrated embodiment is intended merely as a non-limiting example to show various relationships between groups of users that are possible within the scope of the present disclosure.

Groups 202A-202n can represent a primary category of users 52. For example, groups 202A-202n can represent users in individual branches of an organization, such as individual stores. Group 202A can represent a first branch, group 202B can represent a second branch, and group 202n can represent a third branch. Although three groups 202A-202n are illustrated in FIG. 4, it should be understood that other examples can include more or fewer groups 202A-202n.

Groups 202A-202n can be organized under super group 208. Super group 208 is a parent group with respect to groups 202A-202n in that it includes all groups 202A-202n and any subset groups corresponding to those groups 202A-202n. In examples where each of groups 202A-202n represents a branch of an organization, super group 208 can represent users who manage the entire organization or a sector of the organization.

Each of groups 202A-202n can also include corresponding subset groups 204A-204n, 205A-205n, and 206A-206n. As illustrated in FIG. 4, group 202A can include subset groups 204A-204n, group 202B can include subset groups 205A-205n, and group 202n can include subset groups 206A-206n. Although three subset groups 204A-204n, 205A-205n, and 206A-206n are illustrated per each group 202A-202n, it should be understood that other examples can include more of fewer subset groups per each group 202A-202n. Moreover, each group 202A-202n can include the same or different number of corresponding subset groups 204A-204n, 205A-205n, and 206A-206n. In other examples, ones of groups 202A-202n may not include any subset groups. For example, each of subset groups 204A-204n, 205A-205n, and 206A-206n can represent a category of personnel. In one example, subset group 204A could represent operations employees, subset group 204B could represent sales employees, and subset group 204n could represent security employees. In other examples, each of subset groups 204A-204n, 205A-205n, and 206A-206n can represent any category of users 52 that is a subset of the corresponding group 202A-202n.

Each of groups 202A-202n is associated with a corresponding set of tracked assets 210A-210n. As illustrated in FIG. 4, group 202A is associated with set of tracked assets 210A, group 202B is associated with set of tracked assets 210B, and group 202n is associated with set of tracked assets 210n. Each set of tracked assets 210A-210n can encompass any assets that the corresponding one of groups 202A-202n selects to track.

Each set of tracked assets 210A-210n includes tracking devices 212 and assets 214. Tracking devices 212 are examples of tracking devices 60, 60' described above with reference to FIGS. 1A-2. Assets 214 are examples of assets 62 described above with reference to FIG. 1A. Each set of tracked assets 210A-210n can include any number of tracking devices 212 and assets 214. In some examples, ones of groups 202A-202n may select to track assets that are all the same type of asset. For example, set 210A corresponding to group 202A includes assets 214, which are carts, and set 210B corresponding to group 202B includes assets 214, which are vehicles. In other examples, ones of groups 202A-202n may select to track assets that are different types of assets. For example, set 210n corresponding to group 202n includes assets 214, which are packages and vehicles. In general, sets of tracked assets 210A-210n can include any combination of types of assets 214.

Groups 202A-202n, super group 208, and subset groups 204A-204n, 205A-205n, and 206A-206n can be associated with different accessibility levels with respect to centralized device management platform 40 (FIGS. 1A and 2-3), which can be implemented via user interface 50 (FIGS. 1A and 2). In some examples, user interface 50 may only display information (e.g., location information on a map) about a respective one of sets of tracked assets 210A-210n for each of groups 202A-202n. That is, group 202A may have access to information about set of tracked assets 210A but not set 210B or set 210n, group 202B may have access to information about set of tracked assets 210B but not set 210A or set 210n, and group 202n may have access to information about set of tracked assets 210n but not set 210A or set 210B. In some examples, user interface 50 can have a different overall display configuration for each of subset groups 204A-204n, 205A-205n, and 206A-206n. The display configuration for each of subset groups 204A-204n, 205A-205n, and 206A-206n can, in some examples, limit visibility to only certain information about tracking devices 212 and assets 214. In some examples, configuration settings for configuring centralized device management platform 40 may be locked so that only some subset groups 204A-204n, 205A-205n, and 206A-206n can change configurations. In comparison, super group 208 can have more comprehensive access to information about all sets of tracked assets 210A-210n across all groups 202A-202n (i.e., all tracking devices 212 and all assets 214). For example, super group 208 can have access to overall trend information about sets of tracked assets 210A-210n to compare across and between groups 202A-202n.

Groups 202A-202n, super group 208, and subset groups 204A-204n, 205A-205n, and 206A-206n can also each be associated with different notification types or frequencies via output engine 82 (FIGS. 1A and 2). For example, a workflow method of output engine 82 can direct notifications to be sent to groups 202A-202n or particular ones of subset groups 204A-204n, 205A-205n, and 206A-206n for users in those groups to take more immediate action with respect to the corresponding set of tracked assets 210A-201n. On the other hand, a workflow method of output engine 82 can direct notifications to super group 208 relatively infrequently.

Embodiments of organizational hierarchy 200 can be implemented with asset tracking system 10 so that relevant information about tracked assets is available to the appropriate users 52. This can improve efficiency or ease-of-use and security of asset tracking system 10 with respect to user actions. In particular, users in groups 202A-202n or ones of subset groups 204A-204n, 205A-205n, and 206A-206n may only be able to access information that is relevant to their role, such as information about assets associated with their respective branch of the organization. Configuring a user interface (e.g., user interface 50 in FIGS. 1A and 2) based on user roles can ensure that the appropriate personnel are alerted to take corrective action for rogue assets. In comparison, users in super group 208 may be able to access management-level information, such as trends across all branches/locations of the business. This is useful for developing overall business insights based on location data from all the organization's tracked assets, such as to determine which locations are experiencing more instances of rogue assets.

Various non-limiting implementations of asset tracking systems according to techniques of this disclosure (e.g., asset tracking system 10 in FIG. 1A) will be described with reference to FIGS. 5A-8B. Each asset tracking system embodiment shown in FIGS. 5A-8B includes generally similar components, which are identified by shared reference numbers that are increased incrementally between each pair of FIGS. 5A-5B, 6A-6B, 7A-7B, and 8A-8B (e.g., FIGS. 5A-5B include rules engine 340, FIGS. 6A-6B include rules engine 440, FIGS. 7A-7B include rules engine 540, and FIGS. 8A-8B include rules engine 640). Further, each asset tracking system embodiment shown in FIGS. 5A-8B can be an example of asset tracking system 10 of FIG. 1A, with similar components sharing the same name. Some components of the asset tracking system embodiments shown in FIGS. 5A-8B are omitted for ease of discussion, but it should be understood that the asset tracking system embodiments shown in FIGS. 5A-8B can include all or any combination of the components and features described above with respect to FIGS. 1A-4. Additionally, although depicted in FIGS. 5A-8B as separate examples, an asset tracking system according to techniques of this disclosure can include any combination of the following features.

Figure 5A:
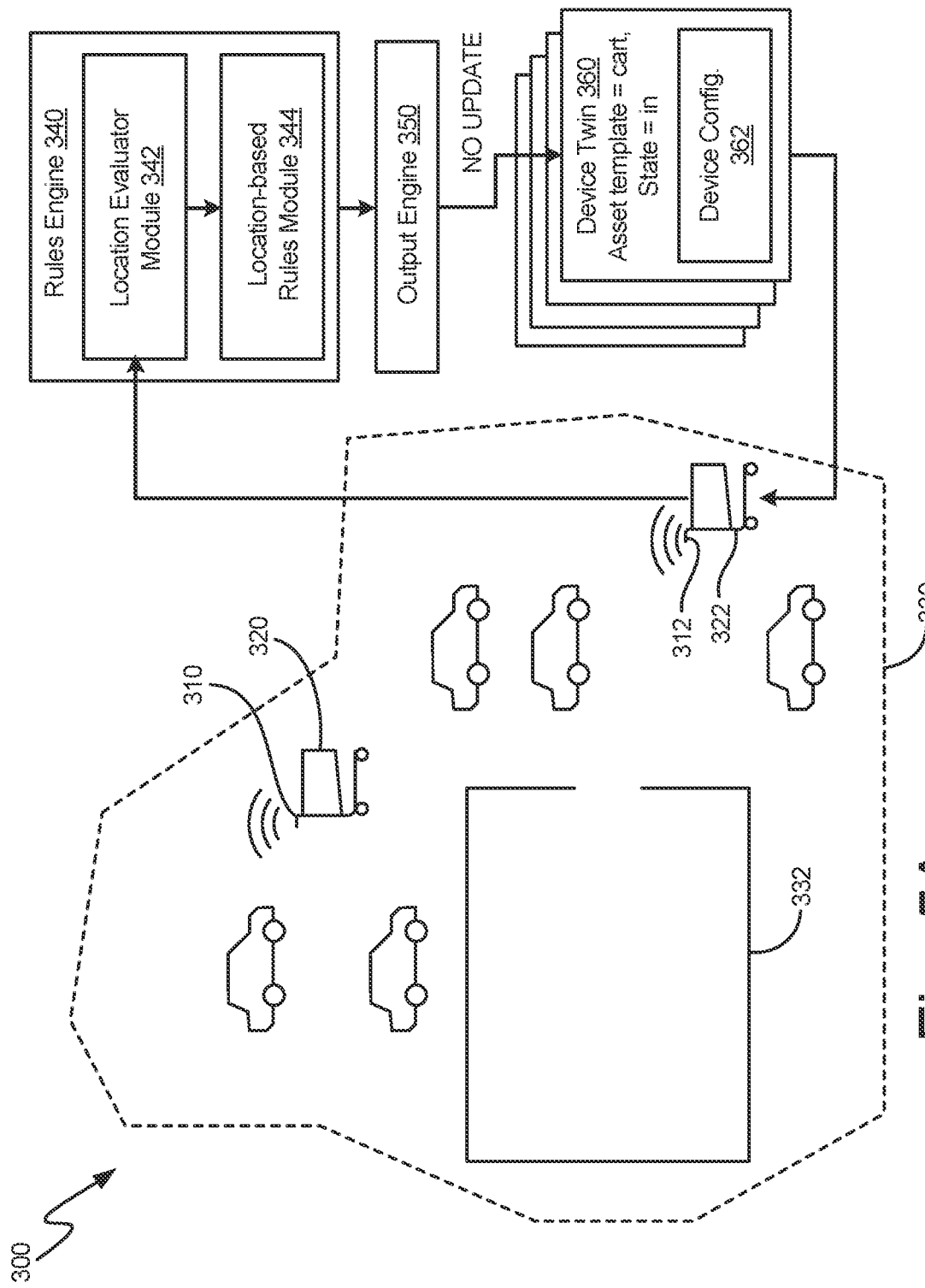
FIGS. 5A-5B are schematic diagrams of an asset tracking system embodiment in which a rules engine includes location-based rules for configuring tracking devices with respect to a geofence zone.
Figure 5B:
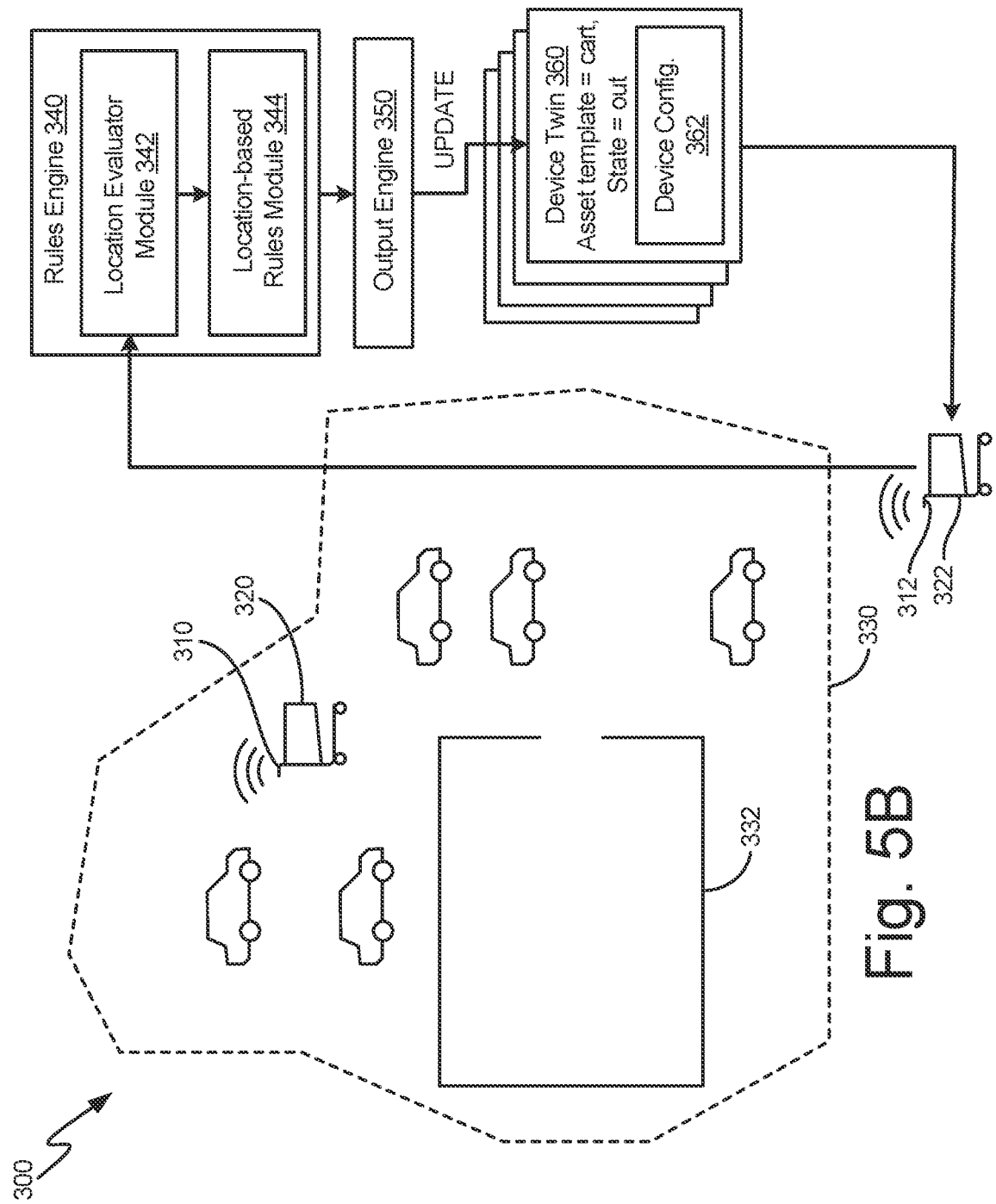

FIGS. 5A-5B are schematic diagrams of asset tracking system 300 in which rules engine 340 includes location-based rules for configuring tracking devices with respect to geofence zone 330. As illustrated in FIGS. 5A-5B, asset tracking system 300 includes tracking devices 310 and 312 and corresponding assets 320 and 322, respectively, geofence zone 330, and map feature 332. Asset tracking system 300 also includes rules engine 340 (including location evaluator module 342 and location-based rules module 344), output engine 350, and device twin 360, which includes corresponding device configuration 362.

In the example shown in FIGS. 5A-5B, geofence zone 330 is an irregular polygonal shape that encompasses a parking lot. Map feature 332 is building, such as a store. Assets 320 and 322 are shopping carts, and device twins 360 can also be considered asset templates for a cart. In FIG. 5A, both tracking device 310 and corresponding asset 320 and tracking device 312 and corresponding asset 322 are located within geofence zone 330. In this example, tracking devices 310 and 312 are already configured based on geofence zone 330 and remain in geofence zone 330. When location data from tracking device 312 is evaluated by location evaluator module 342 and location-based rules module 344 of rules engine 340, a device configuration instruction associated with the rule that is associated with geofence zone 330 will match device configuration 362 in device twin 360 that is assigned to tracking device 312. Accordingly, device twin 360 (and device configuration 362) will not be updated by output engine 350.

FIG. 5B shows a progression from FIG. 5A where tracking device 312 and corresponding asset 322 have moved outside geofence zone 330. In some examples, tracking device 312 and corresponding asset 322 may have been outside geofence zone 330 for at least a threshold amount of time (e.g., a certain number of consecutive location reports). When location data from tracking device 312 is evaluated by location evaluator module 342 and location-based rules module 344 of rules engine 340, a device configuration instruction associated with the rule that is associated with a zone representing an area outside geofence zone 330 will not match device configuration 362 in device twin 360 that is assigned to tracking device 312. Accordingly, device twin 360 (and device configuration 362) will be updated by output engine 350. The update can include, e.g., changing an asset type identification for asset 322, changing a location data reporting frequency for tracking device 312, changing a signal type for transmitting the location data, and changing an enabled or disabled state of a sensor component of tracking device 312, or other changes. For example, the location data reporting frequency of tracking device 312 may be increased to track the movement of asset 322 more continuously because asset 322 is now outside its home location (geofence zone 330). In other examples, the location data reporting frequency of tracking device 312 may be decreased to conserve battery life of tracking device 312, e.g., until asset 322 can be recovered.

Figure 6A:
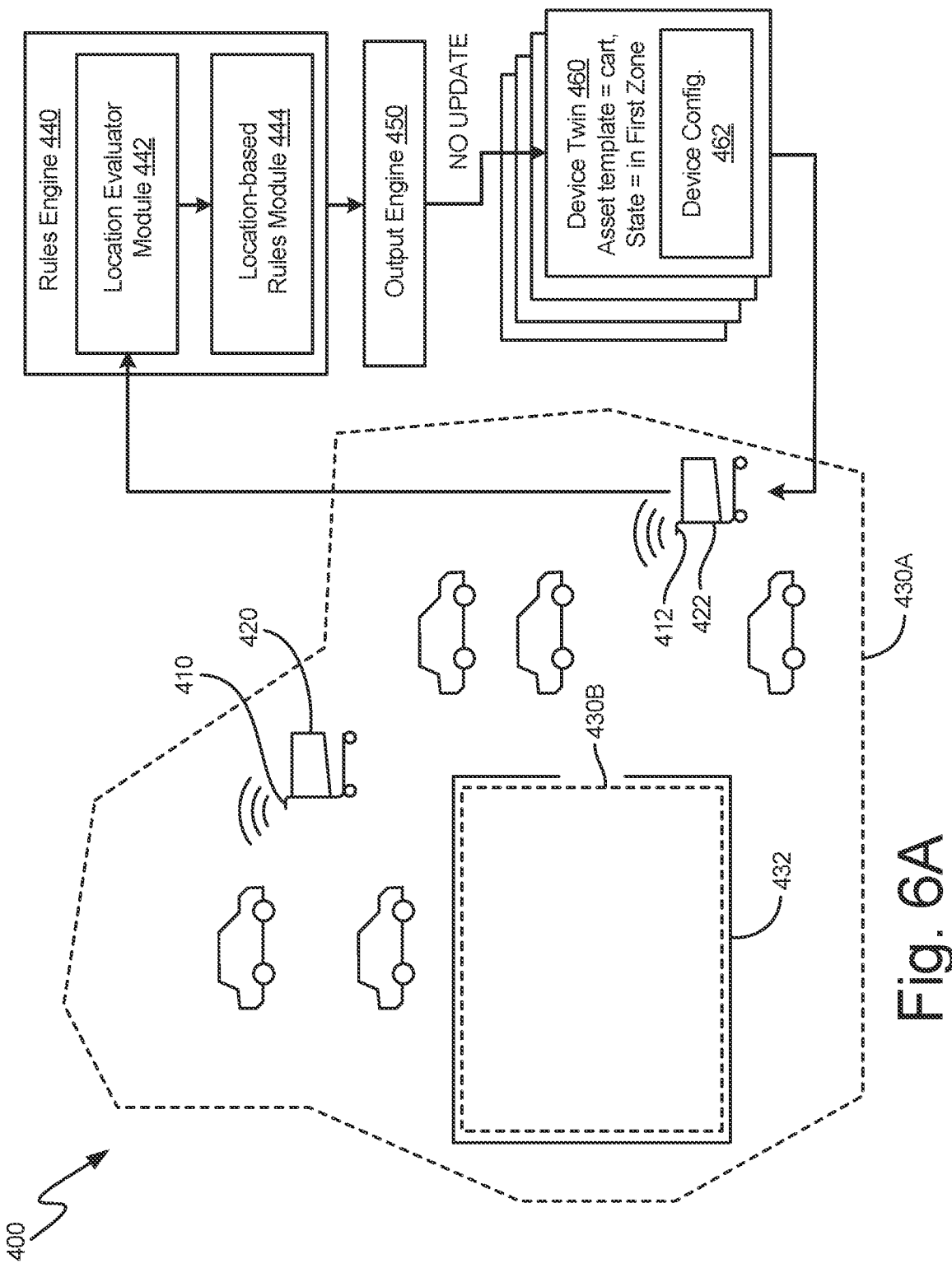
FIGS. 6A-6B are schematic diagrams of an asset tracking system embodiment in which a rules engine includes location-based rules for configuring tracking devices with respect to an inside geofence zone and an outside geofence zone.
Figure 6B:
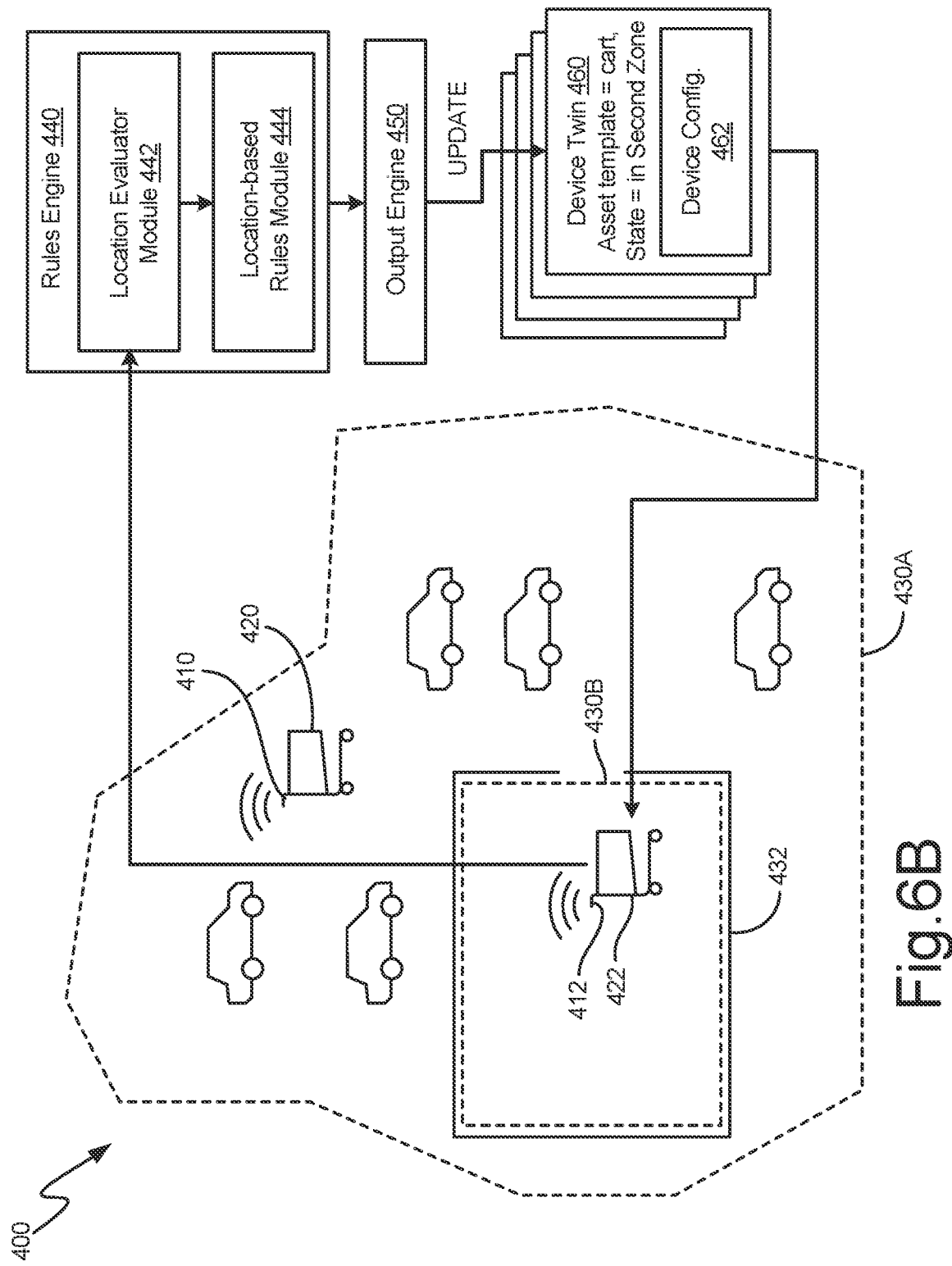

FIGS. 6A-6B are schematic diagrams of asset tracking system 400 in which rules engine 440 includes location-based rules for configuring tracking devices with respect to an inside geofence zone and an outside geofence zone. As illustrated in FIGS. 6A-6B, asset tracking system 400 includes tracking devices 410 and 412 and corresponding assets 420 and 422, respectively, first geofence zone 430A, second geofence zone 430B, and map feature 432. Asset tracking system 400 also includes rules engine 440 (including location evaluator module 442 and location-based rules module 444), output engine 450, and device twin 460, which includes corresponding device configuration 462.

In the example shown in FIGS. 6A-6B, first geofence zone 430A is an irregular polygonal shape that encompasses a parking lot, and second geofence zone 430B is bounded by the walls of map feature 432 such that second geofence zone 430B encompasses the interior of map feature 432 (an inside geofence zone). Second geofence zone 430B is contained within first geofence zone 430A, which is outside map feature 432 (an outside geofence zone). Map feature 432 is building, such as a store. Assets 420 and 422 are shopping carts, and device twins 460 can also be considered asset templates for a cart. In FIG. 6A, both tracking device 410 and corresponding asset 420 and tracking device 412 and corresponding asset 422 are located within first geofence zone 430A. In this example, tracking devices 410 and 412 are already configured based on first geofence zone 430A and remain in first geofence zone 430A. When location data from tracking device 412 is evaluated by location evaluator module 442 and location-based rules module 444 of rules engine 440, a device configuration instruction associated with the rule that is associated with first geofence zone 430 will match device configuration 462 in device twin 460 that is assigned to tracking device 412. Accordingly, device twin 460 (and device configuration 462) will not be updated by output engine 450.

FIG. 6B shows a progression from FIG. 6A where tracking device 412 and corresponding asset 422 have moved from first geofence zone 430A to second geofence zone 430B. In some examples, tracking device 412 and corresponding asset 422 may have been within second geofence zone 430B for at least a threshold amount of time (e.g., a certain number of consecutive location reports). When location data from tracking device 412 is evaluated by location evaluator module 442 and location-based rules module 444 of rules engine 440, a device configuration instruction associated with the rule that is associated with second geofence zone 430B will not match device configuration 462 in device twin 460 that is assigned to tracking device 412. Accordingly, device twin 460 (and device configuration 462) will be updated by output engine 450. The update can include, e.g., changing an asset type identification for asset 422, changing a location data reporting frequency for tracking device 412, changing a signal type for transmitting the location data, and changing an enabled or disabled state of a sensor component of tracking device 412, or other changes. For example, the signal type for tracking device 412 may be changed from a cellular signal (based on a rule associated with first geofence zone 430A) to a Wi-Fi signal because the Wi-Fi signal range may only extend approximately within the walls of building 432.

Figure 7A:
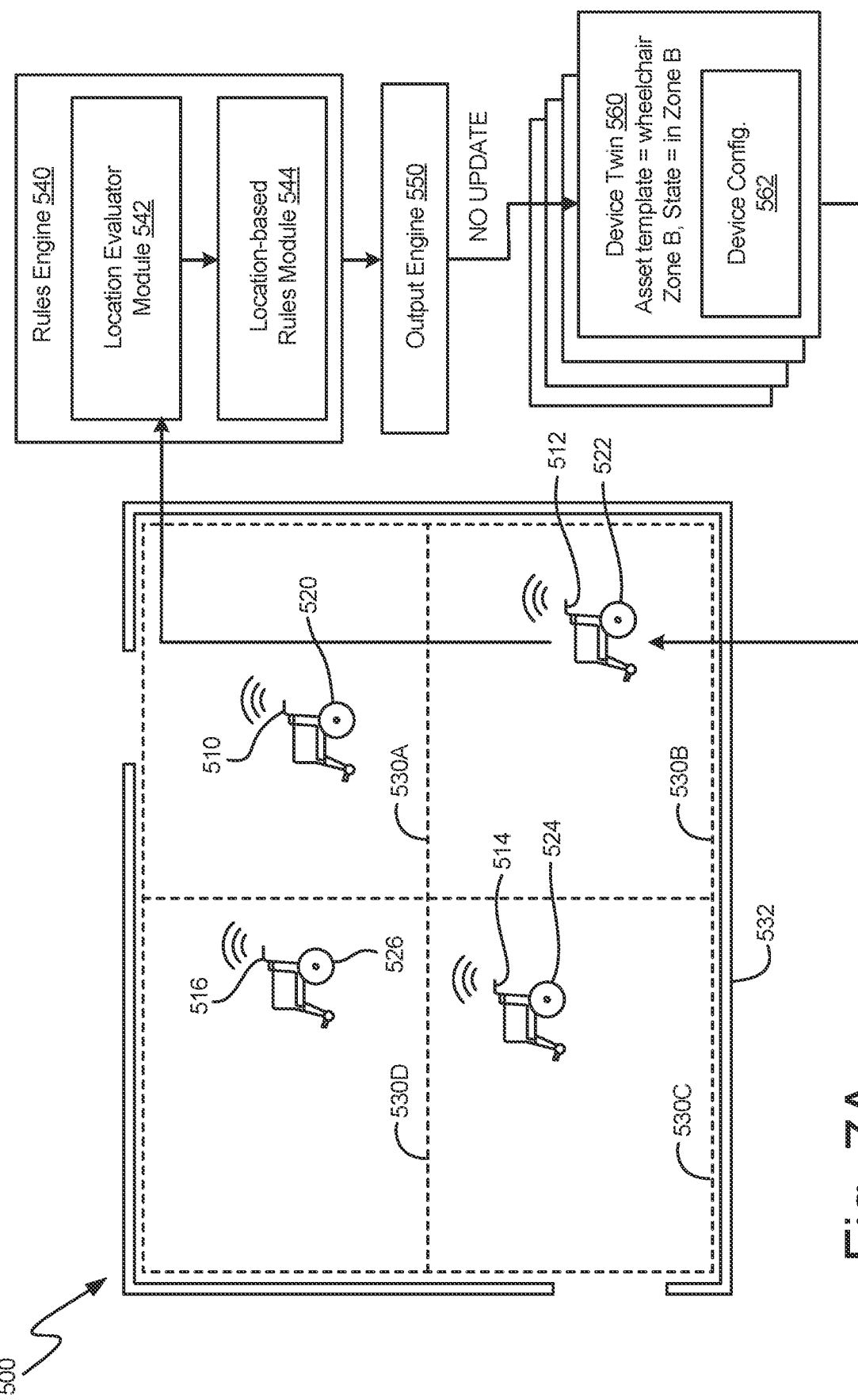
FIGS. 7A-7B are schematic diagrams of an asset tracking system embodiment in which a rules engine includes location-based rules for configuring tracking devices with respect to multiple adjacent geofence zones.
Figure 7B:
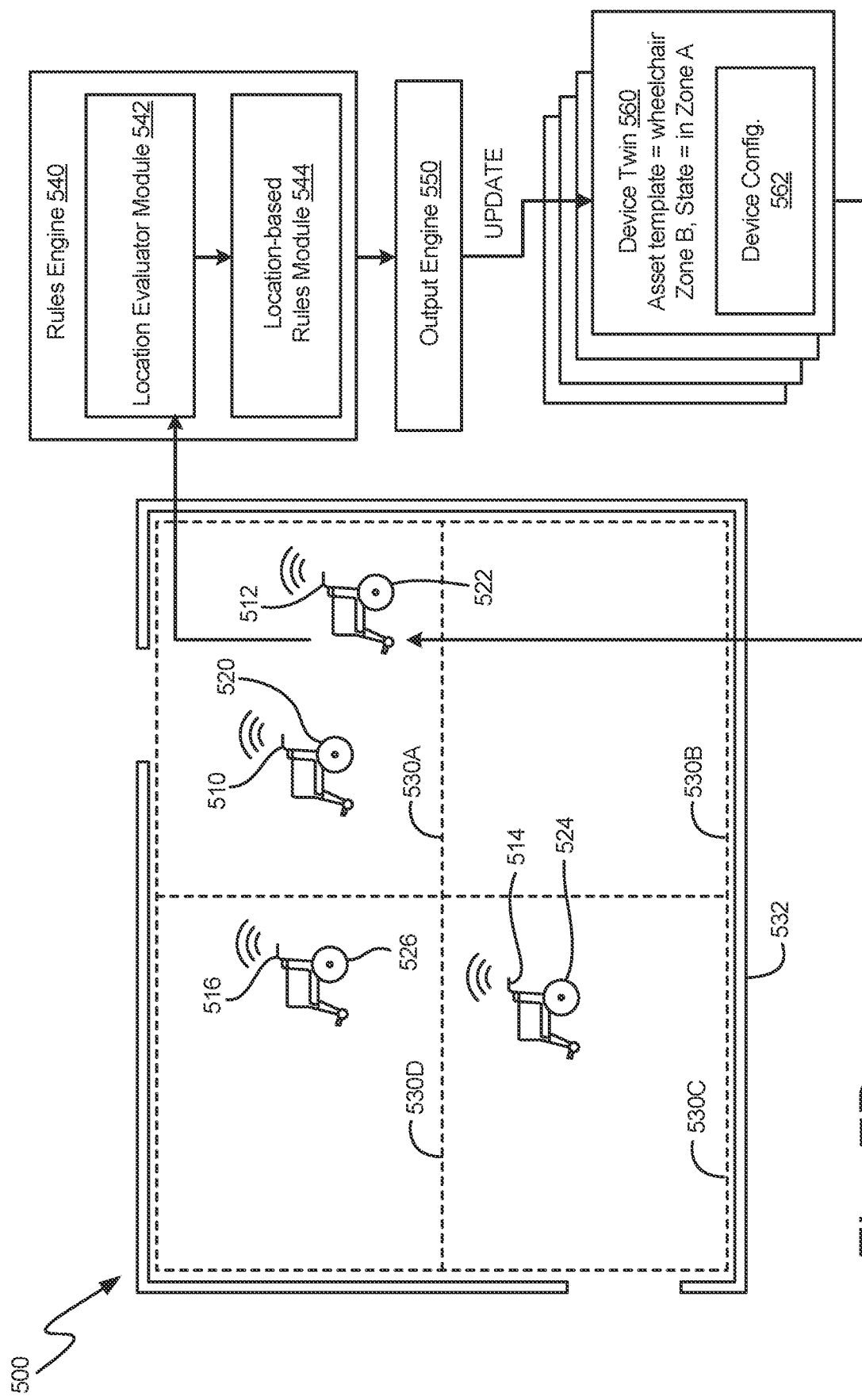

FIGS. 7A-7B are schematic diagrams of asset tracking system 500 in which rules engine 540 includes location-based rules for configuring tracking devices with respect to adjacent geofence zones 530A-530D. As illustrated in FIGS. 7A-7B, asset tracking system 500 includes tracking devices 510, 512, 514, and 516 and corresponding assets 520, 522, 524, and 526, respectively, first geofence zone 530A, second geofence zone 530B, third geofence zone 530C, fourth geofence zone 530D, and map feature 532. Asset tracking system 500 also includes rules engine 540 (including location evaluator module 542 and location-based rules module 544), output engine 550, and device twin 560, which includes corresponding device configuration 562.

In the example shown in FIGS. 7A-7B, first, second, third, and fourth geofence zones 530A-530D are each a polygonal shape that encompasses adjacent first, second, third, and fourth areas, respectively, within the interior of map feature 532. Map feature 532 is building or campus, such as a mall, college, or hospital. For example, each of geofence zones 530A-530D can represent a separate region, department, floor, etc. of a building or a campus of connected buildings. Assets 520, 522, 524, and 526 are wheelchairs, and each of assets 520, 522, 524, and 526 (and corresponding tracking devices 510, 512, 514, and 516) can have a home zone where the asset is expected to be located. For example, the home zone for asset 520 can be first geofence zone 530A (zone A), the home zone for asset 522 can be second geofence zone 530B (zone B), the home zone for asset 524 can be third geofence zone 530C (zone C), and the home zone for asset 526 can be fourth geofence zone 530D (zone D). Accordingly, device twins 560 can also be considered asset templates for wheelchairs in zones A-D.

In FIG. 7A, each of tracking devices 510, 512, 514, and 516 and corresponding assets 520, 522, 524, and 526 are located in their respective home zone. That is, tracking device 510 and asset 520 are in first geofence zone 530A, tracking device 512 and asset 522 are in second geofence zone 530B. tracking device 514 and asset 524 are in third geofence zone 530C, and tracking device 516 and asset 526 are in fourth geofence zone 530D. In this example, tracking devices 510, 512, 514, and 516 are already configured based on the respective home zone and remain in the respective home zone. When location data from tracking device 512 is evaluated by location evaluator module 542 and location-based rules module 544 of rules engine 540, a device configuration instruction associated with the rule that is associated with second geofence zone 530B will match device configuration 562 in device twin 560 that is assigned to tracking device 512. Accordingly, device twin 560 (and device configuration 562) will not be updated by output engine 550.

FIG. 7B shows a progression from FIG. 7A where tracking device 512 and corresponding asset 522 have moved from second geofence zone 530B (the respective home zone) to first geofence zone 530A. In some examples, tracking device 512 and corresponding asset 522 may have been within first geofence zone 530A for at least a threshold amount of time (e.g., a certain number of consecutive location reports). When location data from tracking device 512 is evaluated by location evaluator module 542 and location-based rules module 544 of rules engine 540, a device configuration instruction associated with the rule that is associated with first geofence zone 530A (or a generic "not home zone") will not match device configuration 562 in device twin 560 that is assigned to tracking device 512. Accordingly, device twin 560 (and device configuration 562) will be updated by output engine 550. The update can include, e.g., changing an asset type identification for asset 522, changing a location data reporting frequency for tracking device 512, changing a signal type for transmitting the location data, and changing an enabled or disabled state of a sensor component of tracking device 512, or other changes. For example, the location data reporting frequency of tracking device 512 may be increased to track the movement of asset 522 more continuously because asset 522 is now outside its home zone (second geofence zone 530B).

Figure 8A:
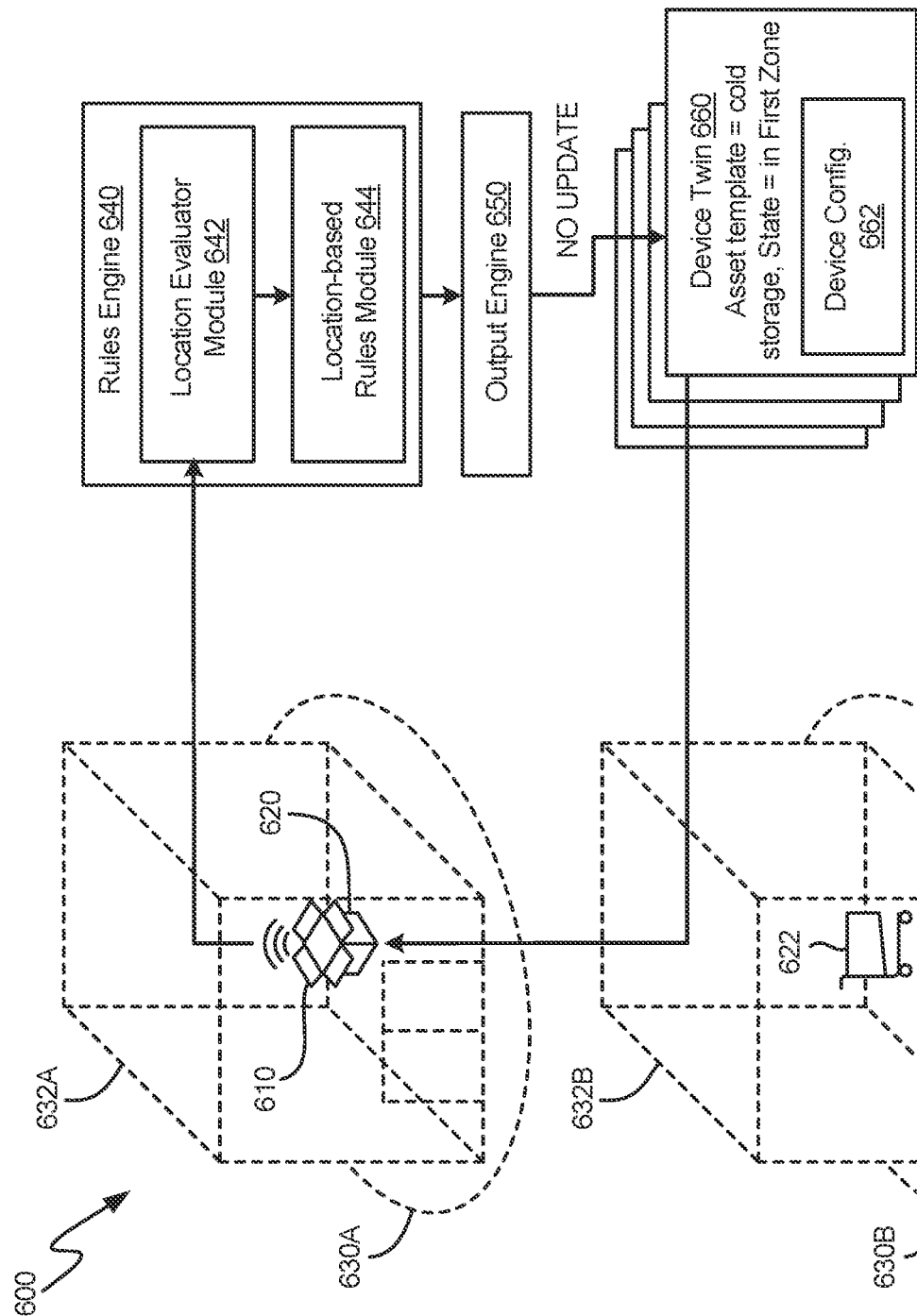
FIGS. 8A-8B are schematic diagrams of an asset tracking system embodiment in which a rules engine includes location-based rules for configuring tracking devices with respect to a first asset type zone and a second asset type zone.
Figure 8B:
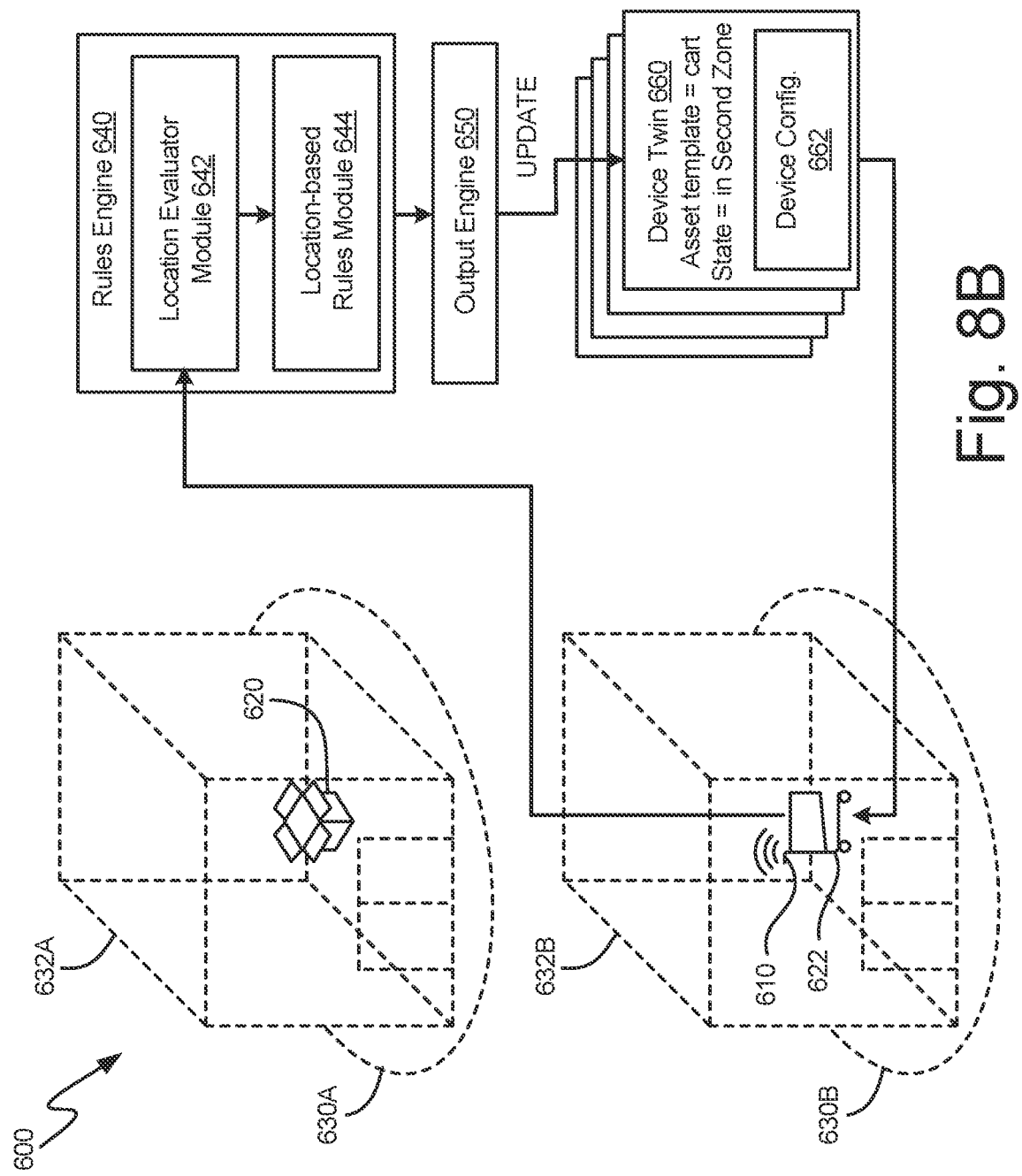

FIGS. 8A-8B are schematic diagrams of asset tracking system 600 in which rules engine 640 includes location-based rules for configuring tracking devices with respect to a first asset type zone and a second asset type zone. In general, FIGS. 8A-8B illustrate an example of repurposing or reassigning a tracking device according to techniques of this disclosure to track another asset or an asset of a different asset type altogether. As illustrated in FIGS. 8A-8B, asset tracking system 600 includes tracking device 610, assets 620 and 622, first geofence zone 630A, second geofence zone 630B, first map feature 632A, and second map feature 632B. Asset tracking system 600 also includes rules engine 640 (including location evaluator module 642 and location-based rules module 644), output engine 650, and device twin 660, which includes corresponding device configuration 662.

In the example shown in FIGS. 8A-8B, first geofence zone 630A is a circular shape that generally encompasses a building (map feature 632A), and second geofence zone 630B is a circular shape that generally encompasses a different building (map feature 632B). Map feature 632A is a cold storage facility and map feature 632B is a store. Asset 620 is a package or container, and a corresponding device twin 660 can be considered an asset template for cold storage. Asset 622 is a shopping cart, and a corresponding device twin 660 could be considered an asset template for a cart, which would be the result of a change caused by moving tracking device 610 from asset 620 to asset 622. In FIG. 8A, only asset 620 is associated with a tracking device (tracking device 610). Tracking device 610 and asset 620 are located in first geofence zone 630A, which can be considered a first asset type zone. Asset 622 is located in second geofence zone 630B, which can be considered a second asset type zone because asset 622 is a different type of asset (shopping cart) than asset 620 (container). In this example, tracking device 610 is already configured based on first geofence zone 630A and remains in first geofence zone 630A. When location data from tracking device 610 is evaluated by location evaluator module 642 and location-based rules module 644 of rules engine 640, a device configuration instruction associated with the rule that is associated with first geofence zone 630A will match device configuration 662 in device twin 660 that is assigned to tracking device 610. Accordingly, device twin 660 (and device configuration 662) will not be updated by output engine 650.

FIG. 8B shows a progression from FIG. 8A where tracking device 610 is removed from asset 620 in first geofence zone 630A and associated with asset 622 in second geofence zone 630B. In some examples, tracking device 610 and corresponding asset 622 may have been within second geofence zone 630B for at least a threshold amount of time (e.g., a certain number of consecutive location reports). When location data from tracking device 610 is evaluated by location evaluator module 642 and location-based rules module 644 of rules engine 640, a device configuration instruction associated with the rule that is associated with second geofence zone 630B will not match device configuration 662 in device twin 660 that is assigned to tracking device 610. Accordingly, device twin 660 (and device configuration 662) will be updated by output engine 650. The update can include, e.g., changing an asset type identification for asset 622, changing a location data reporting frequency for tracking device 612, changing a signal type for transmitting the location data, and changing an enabled or disabled state of a sensor component of tracking device 612, or other changes. For example, the asset type identification can be changed to "shopping cart IDxxx" from "cold storage container IDxxx" now that tracking device 610 is no longer associated with container 620. Additionally, a temperature sensor component of tracking device 610 can be disabled through the device twin 660 and device configuration 662, as its functionality may not be necessary or desired for monitoring cart 622.

FIGS. 5A-8B illustrate various ways an asset tracking system can be implemented according to techniques of the present disclosure. As illustrated in FIGS. 5A-8B, geofence zones for the asset tracking system described herein are widely configurable to capture various boundary-crossing events for tracking devices. This allows for location-based rules to be tailored to a particular organization's layout or conditions (e.g., whether there is a building that assets might be inside or outside of, whether there is a group of assets that should remain in a certain area whereas other groups are assigned to different areas, whether a tracking device has been relocated to a new site with different asset types, etc.). Additionally, having a robust rules engine as described herein allows any number of device configurations to be associated with location-based rules, such that individual aspects of a tracking device can be reconfigured based on a location change (e.g., FIGS. 5A-7B), or the entire tracking device functionality can be changed (e.g., FIGS. 8A-8B).

Figure 9:
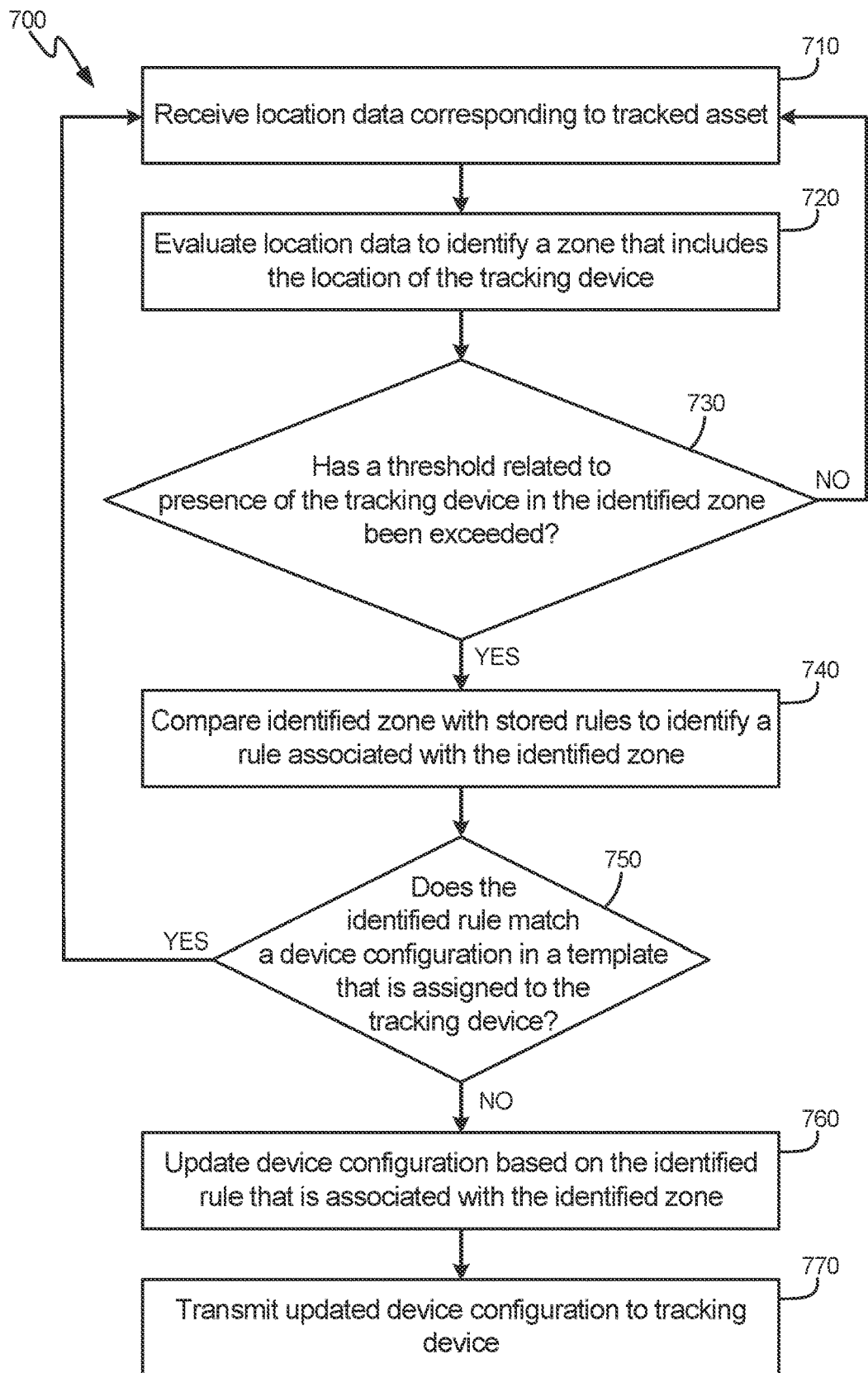
FIG. 9 is a process flowchart illustrating steps of a process for updating tracking device configurations based on location data.

FIG. 9 is a process flowchart illustrating steps 710-770 of process 700 for updating tracking device configurations based on location data. Process 700 for updating tracking device configurations based on location data will be described with reference to components of asset tracking system 10 described above (FIGS. 1A-4), though process 700 is also applicable to asset tracking systems 300, 400, 500, and 600 (FIGS. 5A-8B). That is, although depicted in FIGS. 1A-8B as separate examples, an asset tracking system according to techniques of this disclosure can include any combination of the foregoing features.

As illustrated in FIG. 9, a first step of process 700 is to receive location data corresponding to a tracked asset (e.g., one of assets 62 and a corresponding tracking device 60) (step 710). At step 720, the location data is evaluated to identify a zone that includes the location of the tracking device. For example, the location data can be retrieved from location data store 30 and evaluated at rules engine 76 (e.g., location evaluator module 78) of centralized device management platform 40.

At step 730, a first decision is made within process 700 to determine if a threshold related to presence of the tracking device in the identified zone (identified at step 720) has been exceeded. For example, location evaluator module 78 can include a function for counting consecutive location data reports from tracking devices 60 that are within the same zone. In other examples, location evaluator module 78 can include a function for determining a distance that tracking devices 60 have traveled into the identified zone. If there has been more than one consecutive location reported from the tracking device in the identified zone such that a threshold duration is exceeded or if the distance the tracking device has traveled exceeds a threshold distance (YES), then process 700 proceeds to step 740. If there has not been more than one consecutive location reported from the tracking device in the identified zone of if the distance the tracking device has traveled is less than the threshold distance (NO), then process 700 returns to step 710. In alternative examples, process 700 does not include step 730, i.e., process 700 proceeds directly from step 720 to step 740. At step 740, the identified zone is compared with stored rules to identify a rule that is associated with the identified zone. For example, location-based rules module 80 of rules engine 76 can identify a rule associated with the identified zone.

At step 750, a second decision is made within process 700 to determine if the identified rule matches a device configuration in a template that is assigned to the tracking device. For example, each of tracking devices 60 is implemented according to a corresponding device twin (or template) 46 that includes a device configuration for the respective tracking device 60. The corresponding device twin 46 can be accessed by centralized device management platform 40. If the identified rule from rules engine 76 is associated with a device configuration instruction that does not match the device configuration currently defined in the corresponding device twin 46 (NO), then process 700 proceeds to step 760. If the identified rule from rules engine 76 is associated with a device configuration instruction that matches the device configuration currently defined in the corresponding device twin 46 (YES), then process 700 returns to step 710 because the corresponding device twin 46 does not need to be updated. In alternative examples, process 700 does not include step 750, i.e., process 700 proceeds directly from step 740 to step 760.

At step 760, the device configuration is updated based on the identified rule that is associated with the identified zone, and, at step 770, the updated device configuration is transmitted to the tracking device. For example, output engine 82 can cause the corresponding device twin 46 to be updated and sync the updated configuration to the respective tracking device 60. Accordingly, the respective tracking device 60 will be updated and reconfigured based on the rule from rules engine 76 that is associated with zone that includes the most-recently reported location of the device.

As described above with respect to FIGS. 1A-8B, an asset tracking system according to techniques of this disclosure allows for dynamic asset tracking that is both broadly applicable to various tracking scenarios and readily modifiable.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An asset tracking system comprising:
   a tracking device associated with a mobile asset, the tracking device configured via a set of device configurations;
   a centralized device management platform including one or more processors in communication with the tracking device; and
   computer-readable memory encoded with instructions that, when executed by the one or more processors, cause the asset tracking system to:
   receive location data corresponding to a location of the tracking device;

evaluate the location data to identify a zone corresponding to a physical region that includes the location of the tracking device;
compare an identified zone with a set of location-based rules to identify a rule associated with the identified zone;
update the set of device configurations with a device configuration that is associated with an identified rule, wherein:
the device configuration that is associated with the identified rule is different from a pre-existing device configuration that is defined in the set of device configurations;
the pre-existing device configuration that is defined in the set of device configurations and the device configuration that is associated with identified rule include a first and second signal type, respectively;
the second signal type is different from the first signal type; and
one of the first signal type and the second signal type is a cellular network signal; and
sync an updated set of device configurations to the tracking device to reconfigure the tracking device based on the identified rule.

2. The asset tracking system of claim 1, wherein the set of device configurations defines, for the tracking device, at least one of:
an asset type identification;
a location data reporting frequency;
a signal type for transmitting the location data; and
whether a sensor component of the tracking device is enabled or disabled.

3. The asset tracking system of claim 1, wherein the pre-existing device configuration that is defined in the set of device configurations and the device configuration that is associated with identified rule include a first and second location data reporting frequency, respectively; and wherein the second location data reporting frequency is different from the first location data reporting frequency.

4. The asset tracking system of claim 1 and further comprising:
an output engine;
wherein the output engine determines when the identified rule is associated with a notification; and
wherein the output engine communicates the notification to one or more groups of users.

5. The asset tracking system of claim 1, wherein the tracking device is communicatively connected to at least one of a temperature sensor, a pressure sensor, and a thermal imaging device.

6. The asset tracking system of claim 1, wherein the set of device configurations is stored as a digital twin of the tracking device; and wherein the digital twin is accessible by both the centralized device management platform and the tracking device.

7. A method of tracking mobile assets using a centralized device management platform that is remote from the mobile assets, the method comprising:
receiving location data corresponding to a location of a tracking device that is associated with a mobile asset, the tracking device configured via a set of device configurations;
evaluating the location data by a computer-based rules engine of the centralized device management platform to identify a zone corresponding to a physical region that includes the location of the tracking device;
comparing, by the rules engine, an identified zone with a set of location-based rules to identify a rule associated with the identified zone;
updating the set of device configurations with a device configuration that is associated with an identified rule, wherein:
a pre-existing device configuration that is defined in the set of device configurations and the device configuration that is associated with identified rule include a first and second signal type, respectively;
the second signal type is different from the first signal type; and
one of the first signal type and the second signal type is a cellular network signal; and
syncing an updated set of device configurations to the tracking device.

8. The method of claim 7, wherein syncing the updated set of device configurations to the tracking device further includes:
reconfiguring the tracking device based on the identified rule; and
changing a functionality of the tracking device.

9. The method of claim 8, wherein changing the functionality of the tracking device further includes at least one of:
changing an asset type identification;
changing a location data reporting frequency;
changing a signal type for transmitting the location data; and
changing an enabled or disabled state of a sensor component of the tracking device.

10. The method of claim 7, wherein the pre-existing device configuration that is defined in the set of device configurations and the device configuration that is associated with identified rule include a first and second location data reporting frequency, respectively; and wherein the second location data reporting is different from the first location data reporting frequency.

11. The method of claim 7 and further comprising:
determining, by an output engine, that the identified rule is associated with a first notification; and
communicating the first notification, by the output engine, to a group of users.

12. The method of claim 11 and further comprising:
determining, by the output engine, that the identified rule is associated with a second notification; and
communicating the second notification, by the output engine, to a subset group associated with the group of users.

13. The method of claim 12, wherein the first notification is different from the second notification.

14. The method of claim 12, wherein the first notification is communicated at a first frequency and the second notification is communicated at a second frequency.

15. The method of claim 14, wherein the second frequency is greater than the first frequency.

16. The method of claim 12 and further comprising:
determining, by the output engine, that the identified rule is associated with a third notification; and
communicating the third notification, by the output engine, to a super group associated with the group of users;
wherein the third notification includes overall asset tracking trend information.

17. The method of claim 7, wherein the set of device configurations is stored as a digital twin of the tracking device.

18. The method of claim 17, wherein updating the set of device configurations further includes accessing the digital twin by the centralized device management platform; and wherein syncing the updated set of device configurations to the tracking device further includes accessing the digital twin by the tracking device.

19. The method of claim 7 and further comprising:
determining if a threshold related to presence of the tracking device in the identified zone has been exceeded.

20. The method of claim 19, wherein the threshold is a distance that the tracking device has traveled within the identified zone; or
wherein the threshold is a duration that the tracking device has been in the identified zone, and determining if the threshold related to presence of the tracking device in the identified zone has been exceeded further includes determining if consecutive location data transmissions from the tracking device correspond to a same zone.

\* \* \* \* \*